(12) United States Patent
Hayashi et al.

(10) Patent No.: US 12,071,510 B2
(45) Date of Patent: Aug. 27, 2024

(54) PERFLUOROPOLYETHER-BASED RUBBER COMPOSITION, CURED OBJECT OBTAINED THEREFROM, AND PRODUCT INCLUDING SAME

(71) Applicant: Shin-Etsu Chemical Co., Ltd., Tokyo (JP)

(72) Inventors: Ryuto Hayashi, Annaka (JP); Kenichi Fukuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 630 days.

(21) Appl. No.: 17/294,286

(22) PCT Filed: Nov. 11, 2019

(86) PCT No.: PCT/JP2019/044098
§ 371 (c)(1),
(2) Date: May 14, 2021

(87) PCT Pub. No.: WO2020/110680
PCT Pub. Date: Jun. 4, 2020

(65) Prior Publication Data
US 2022/0010061 A1 Jan. 13, 2022

(30) Foreign Application Priority Data

Nov. 28, 2018 (JP) ................. 2018-222453

(51) Int. Cl.
C08G 65/00 (2006.01)
C08G 65/333 (2006.01)
C08G 73/08 (2006.01)

(52) U.S. Cl.
CPC .......... C08G 65/007 (2013.01); C08G 65/333 (2013.01); C08G 73/08 (2013.01); C08G 2650/48 (2013.01)

(58) Field of Classification Search
None
See application file for complete search history.

(56) References Cited

U.S. PATENT DOCUMENTS

| | | |
|---|---|---|
| 6,020,450 A | 2/2000 | Matsuda et al. |
| 2001/0008916 A1 | 7/2001 | Sato et al. |
| 2002/0019483 A1 | 2/2002 | Sato et al. |
| 2006/0270791 A1 | 11/2006 | Kishita et al. |
| 2012/0028858 A1 | 2/2012 | Wadgaonkar et al. |
| 2015/0259450 A1* | 9/2015 | Corveleyn ....... C08G 65/33365 526/204 |
| 2015/0274960 A1 | 10/2015 | Fukuda et al. |
| 2018/0186934 A1* | 7/2018 | Charlas ............ C08G 65/33365 |
| 2019/0169369 A1* | 6/2019 | Hayashi ............... C08G 65/338 |

FOREIGN PATENT DOCUMENTS

| | | |
|---|---|---|
| EP | 1 033 387 B1 | 5/2004 |
| JP | 9-77944 A | 3/1997 |
| JP | 9-137027 A | 5/1997 |
| JP | 2000-248166 A | 9/2000 |
| JP | 2001-192546 A | 7/2001 |
| JP | 2002-20615 A | 1/2002 |
| JP | 2007-2228 A | 1/2007 |
| JP | 2012-522881 A | 9/2012 |
| JP | 2014-98147 A | 5/2014 |
| JP | 6160540 B2 | 7/2017 |

OTHER PUBLICATIONS

International Search Report for PCT/JP2019/044098 mailed on Feb. 4, 2020.
Written Opinion of the International Searching Authority for PCT/JP2019/044098 mailed on Feb. 4, 2020.

* cited by examiner

*Primary Examiner* — Nicole M. Buie-Hatcher
(74) *Attorney, Agent, or Firm* — Birch, Stewart, Kolasch & Birch, LLP

(57) ABSTRACT

A perfluoropolyether-based rubber composition which gives cured objects excellent in terms of heat resistance, low-temperature resistance, organic-solvent resistance, and acid resistance, the rubber composition being characterized by comprising (a) a linear perfluoropolyether compound having a number-average molecular weight of 1,000-100,000 and including at least two azido groups in the molecule and a divalent perfluoroalkyl ether structure in the main chain and (b) a linear perfluoropolyether compound having at least three ethynyl groups in the molecule.

14 Claims, 3 Drawing Sheets

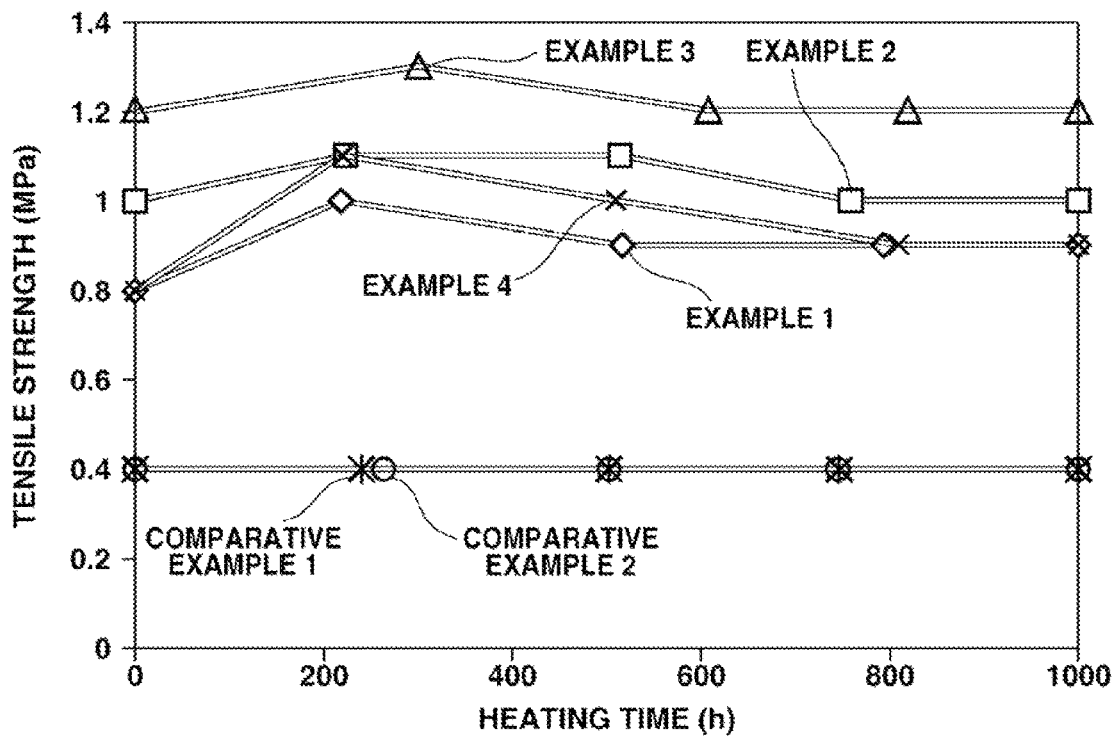
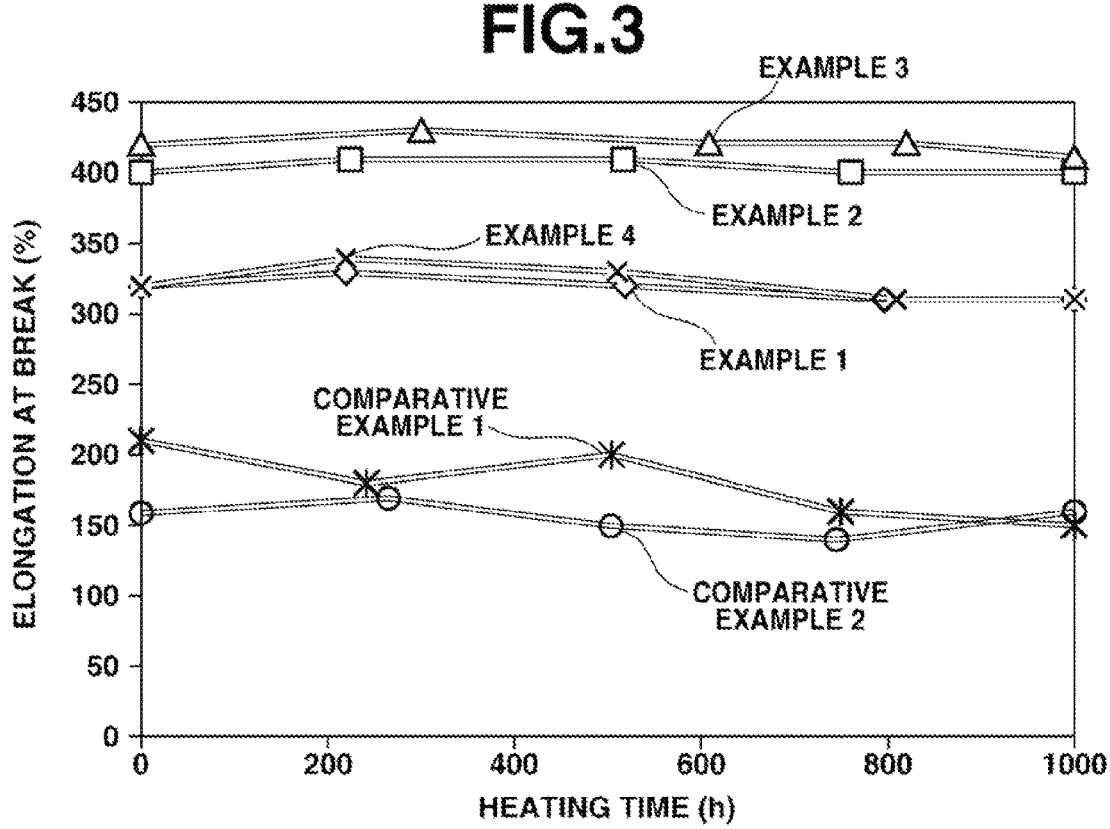

PERFLUOROPOLYETHER-BASED RUBBER COMPOSITION, CURED OBJECT OBTAINED THEREFROM, AND PRODUCT INCLUDING SAME

TECHNICAL FIELD

This invention relates to a perfluoropolyether-based rubber composition comprising a linear perfluoropolyether compound containing at least two azide groups per molecule and a linear perfluoropolyether compound containing at least three ethynyl (—C≡C—H) groups per molecule, and a cured product thereof. More particularly, it relates to a perfluoropolyether-based rubber composition which is characterized in that the curable composition comprising the aforementioned compounds cures through crosslinking reaction (formation of a triazole structure by means of click reaction) that takes place upon heating or in that the composition further comprising (c) a transition metal catalyst cures through the formation of a triazole structure by means of click reaction that takes place at room temperature (23° C.±10° C.), the composition providing a cured product having improved heat resistance, organic solvent resistance, and chemical resistance, especially acid resistance, a cured product thereof, and an article comprising the cured product.

BACKGROUND ART

Because of a good profile of heat resistance, low-temperature performance, chemical resistance, solvent resistance, and oil resistance, heat curable perfluoropolyether-based rubber compositions are used in a wide variety of applications, typically in the automotive industry, as disclosed in Patent Documents 1 to 3 (JP-A 2001-192546, JP-A 2000-248166, and JP-A 2002-020615). Mostly known are heat curable perfluoropolyether-based rubber compositions adapted to cure through crosslinking reaction in the form of hydrosilylation in the presence of a metal base catalyst, typically platinum base catalyst.

Of the heat curable perfluoropolyether-based rubber compositions, an exemplary composition comprising a perfluoropolyether-based compound terminated with a skeleton: [aromatic ring-silicon atom-vinyl group] as the base polymer is known. The composition sometimes exhibits low chemical resistance, especially low acid resistance because the skeleton: [aromatic ring-silicon atom] is unstable. It is known from Patent Document 4 (JP 6160540) that this problem can be ameliorated by using a perfluoropolyether-based compound terminated with [amide group (having aromatic substituent as pendant)-alkylene group-silicon atom-vinyl group] as the base polymer. Although the rubber composition and a cured product thereof are surely improved in sulfuric acid resistance, a hardening degradation tendency is sometimes observed with respect to nitric acid resistance. In view of the expansion of their application to adhesives or the like, such degradation is undesirable because it leads to a likelihood of interfacial peeling.

Further, the heat curable perfluoropolyether-based rubber compositions which cure through crosslinking reaction in the form of hydrosilylation may encounter a cure failure in the presence of a substance containing phosphorus, sulfur, nitrogen or similar atom. Since heat is necessary to obtain cured products, these compositions are unsuitable to apply to large-size parts which are too large to place in heating ovens or heat-sensitive parts. As the perfluoropolyether-based rubber composition that overcomes these drawbacks, room temperature curable perfluoropolyether-based rubber compositions of condensation cure type are proposed in Patent Documents 5 and 6 (JP-A H09-077944 and JP-A H09-137027). Not only these compositions cure into cured products without a need for heating, but the cured products also have improved properties including heat resistance, low-temperature performance, chemical resistance, solvent resistance, and oil resistance. However, the prior art well-known room temperature curable perfluoropolyether-based rubber compositions of dealcoholization condensation cure type are readily degraded under such conditions as long-term exposure to acid because of low acid resistance of siloxane bonds.

Under the circumstances, there is a strong need for curable (both heat curable and room temperature curable) perfluoropolyether-based rubber compositions having improved chemical resistance, especially acid resistance.

PRIOR ART DOCMENTS

Patent Documents

Patent Document 1: JP-A 2001-192546
Patent Document 2: JP-A 2000-248166
Patent Document 3: JP-A 2002-020615
Patent Document 4: JP 6160540
Patent Document 5: JP-A H09-077944
Patent Document 6: JP-A H09-137027

SUMMARY OF INVENTION

Technical Problem

An object of the invention, which has been made under the above-mentioned circumstances, is to provide a perfluoropolyether-based rubber composition capable of providing a cured product having improved heat resistance, low-temperature properties (freeze resistance), organic solvent resistance, and chemical resistance, especially acid resistance, a cured product thereof, and an article comprising the cured product.

Solution to Problem

It is known that a 1,3-dipolar cycloaddition reaction between azide and alkyne to form a triazole structure takes place at elevated temperature and the same reaction takes place even at room temperature when a catalyst of transition metal such as copper is added. This reaction is well known as Huisgen cycloaddition reaction or click reaction. Making extensive investigations to attain the above object with a focus on the use of this reaction, the inventors have found that a heat curable perfluoropolyether-based rubber composition comprising (a) a linear perfluoropolyether compound containing at least two azide groups per molecule and a divalent perfluoroalkylether structure in its main chain, and having a number average molecular weight of 1,000 to 100,000 and (b) a linear perfluoropolyether compound containing at least three ethynyl (—C≡C—H) groups per molecule provides a cured product having improved heat resistance, freeze resistance, solvent resistance, and chemical resistance, especially acid resistance and has improved curing properties at elevated temperature. It has also been found that a room temperature curable perfluoropolyether-based rubber composition obtained by adding (c) a transition metal catalyst to components (a) and (b) has improved curing properties at room temperature. The invention is predicated on these findings.

The invention provides a perfluoropolyether-based rubber composition, a cured product thereof, and an article comprising the cured product, as defined below.

1.

A perfluoropolyether-based rubber composition comprising:

(a) a linear perfluoropolyether compound containing at least two azide groups per molecule and a divalent perfluoroalkylether structure in its main chain, and having a number average molecular weight of 1,000 to 100,000 and (b) a linear perfluoropolyether compound containing at least three ethynyl groups per molecule.

2.

The perfluoropolyether-based rubber composition of 1 wherein component (a) is a compound having the following general formula (1):

  (1)

wherein A is a divalent straight aliphatic saturated hydrocarbon group of 1 to 6 carbon atoms and $Rf^1$ is a divalent perfluoropolyether group.

3.

The perfluoropolyether-based rubber composition of 1 or 2 wherein component (b) is a compound having the following general formula (2):

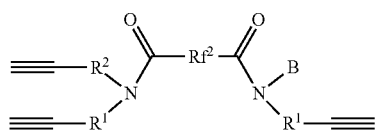  (2)

wherein $R^1$ and $R^2$ are each independently a divalent straight or branched aliphatic saturated hydrocarbon group or arylene group, B is hydrogen, phenyl, a monovalent straight or branched aliphatic unsaturated hydrocarbon group or a group having the following general formula (3):

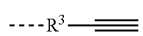  (3)

wherein $R^3$ is a divalent straight or branched aliphatic saturated hydrocarbon group or arylene group and the broken line designates a valence bond, and $Rf^2$ is a divalent perfluoropolyether group, with the proviso that $R^1$ and $R^2$ on the left in formula (2), and $R^1$ and B (or $R^3$ when B is a group of formula (3)) on the right in formula (2) may be linked via a single or double bond to form a cyclic structure attached to the corresponding nitrogen atom.

4.

The perfluoropolyether-based rubber composition of 3 wherein $R^1$ and $R^2$ in the general formula (2) each are a divalent straight aliphatic saturated hydrocarbon group of 1 to 10 carbon atoms, a divalent branched aliphatic saturated hydrocarbon group of 2 to 10 carbon atoms, or an arylene group having any one of the following general formulae (4) to (9):

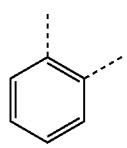  (4)

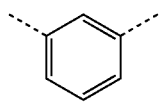  (5)

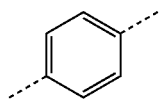  (6)

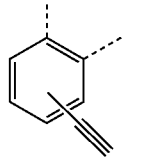  (7)

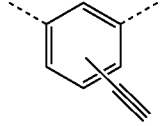  (8)

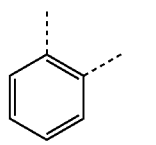  (9)

wherein the broken line designates a valence bond.

5.

The perfluoropolyether-based rubber composition of 3 or 4 wherein $R^3$ in the general formula (3) is a divalent straight aliphatic saturated hydrocarbon group of 1 to 10 carbon atoms, a divalent branched aliphatic saturated hydrocarbon group of 2 to 10 carbon atoms, or an arylene group having any one of the following general formulae (4) to (9):

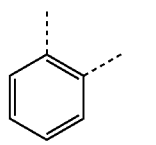  (4)

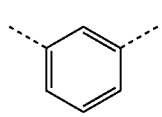  (5)

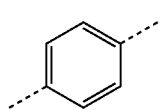  (6)

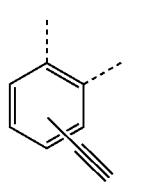  (7)

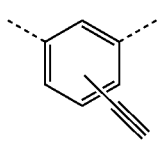

(8)

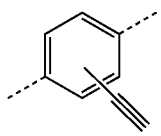

(9)

wherein the broken line designates a valence bond.

6.

The perfluoropolyether-based rubber composition of any one of 1 to 5 which is heat curable.

7.

The perfluoropolyether-based rubber composition of any one of 1 to 5, further comprising (c) a transition metal catalyst.

8.

The perfluoropolyether-based rubber composition of 7 which is room temperature curable.

9.

A perfluoropolyether-based rubber cured product which is formed by curing the perfluoropolyether-based rubber composition of any one of 1 to 8.

10.

An article comprising the cured product of 9.

11.

The article of 10 which is a rubber part for use in an automobile, chemical plant, inkjet printer, semiconductor manufacturing line, analytical or scientific instrument, medical equipment, residential environment or aircraft.

Advantageous Effects of Invention

According to the invention, there is provided a perfluoropolyether-based rubber composition capable of affording a cured product having improved heat resistance, low-temperature properties (freeze resistance), organic solvent resistance, and chemical resistance, and especially improved acid resistance. Rubber articles comprising the cured product of the composition are advantageously used as rubber parts in automobiles, chemical plants, inkjet printers, semiconductor manufacturing lines, analytical or scientific instruments, medical equipment, residential environment, and aircraft.

BRIEF DESCRIPTION OF DRAWINGS

FIG. 2 is a diagram showing transitions of the tensile strength of the cured products prepared in Examples 1 to 4 and Comparative Examples 1 and 2 in a heat aging resistance test.

FIG. 3 is a diagram showing transitions of the elongation at break of the cured products prepared in Examples 1 to 4 and Comparative Examples 1 and 2 in a heat aging resistance test.

DESCRIPTION OF EMBODIMENTS

Figure 1:
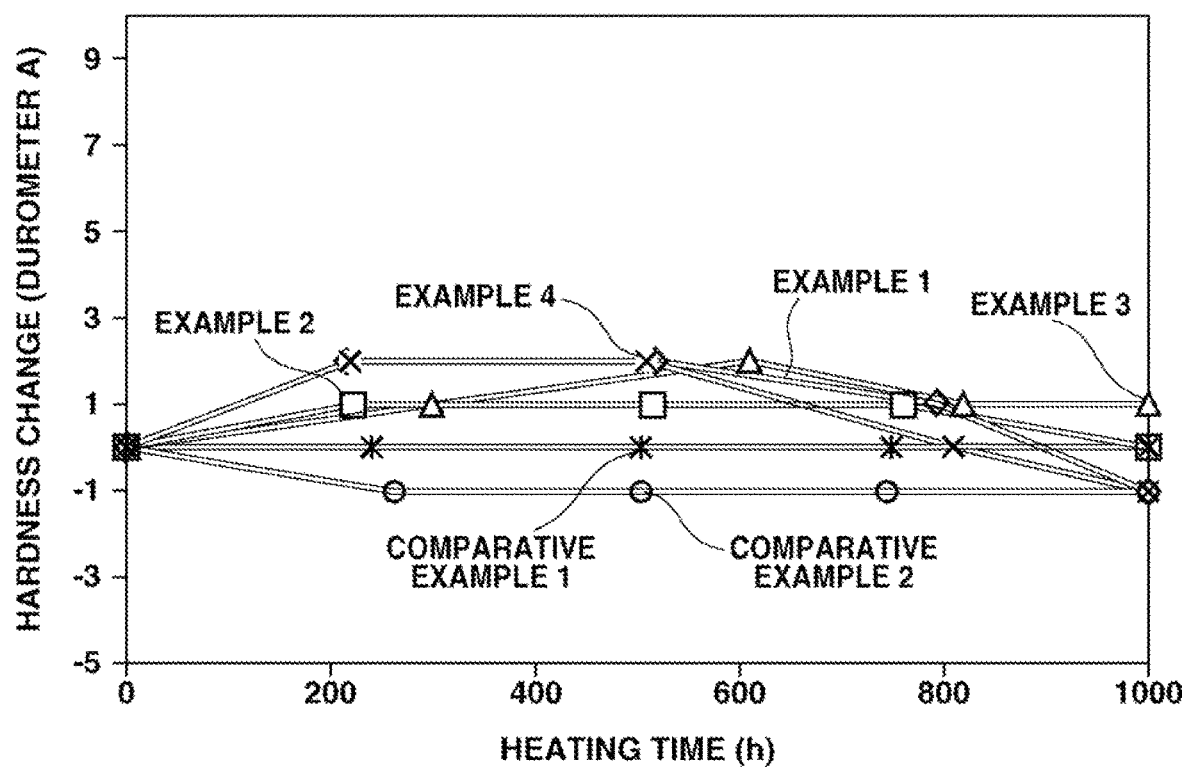
FIG. 1 is a diagram showing transitions of the hardness change of the cured products prepared in Examples 1 to 4 and Comparative Examples 1 and 2 in a heat aging resistance test.

The invention provides a perfluoropolyether-based rubber composition comprising:

(a) a linear perfluoropolyether compound containing at least two azide groups per molecule and a divalent perfluoroalkylether structure in its main chain, and having a number average molecular weight of 1,000 to 100,000 and (b) a linear perfluoropolyether compound containing at least three ethynyl (—C≡C—H) groups per molecule.

Now the invention is described in detail.

[Component (a)]

Component (a) used herein is a linear fluoropolyether compound (base polymer) containing at least two azide groups per molecule and a divalent perfluoropolyether structure (i.e., structure containing repeating perfluoroalkylether units of one or more types) in its main chain, the compound having a number average molecular weight of 1,000 to 100,000.

Component (a) is preferably a linear compound (fluoropolymer) having the following general formula (1):

[Chem. 6]

$$N_3\text{-A-Rf}^1\text{-A-}N_3 \quad (1)$$

wherein A is a divalent straight aliphatic saturated hydrocarbon group of 1 to 6 carbon atoms and $Rf^1$ is a divalent perfluoropolyether group, that is, a compound having an azide group ($N_3$) via a straight alkylene group (A) at each end of a divalent perfluoropolyether group as the polymer dual end structure.

In formula (1), A is preferably a straight alkylene group such as methylene, ethylene, propylene, butylene, pentamethylene or hexamethylene, more preferably methylene or ethylene, and even more preferably methylene. If A is a straight alkylene group which is longer than the above alkylene group, a cured product may lose organic solvent resistance. Thus, the azidoalkyl (-A-$N_3$) linkage at each of the polymer molecular chain ends is preferably azidomethyl, azidoethyl or the like.

The divalent perfluoropolyether group $Rf^1$ preferably contains repeating perfluoroalkylether units of one or more types having the formula: —$C_aF_{2a}O$— wherein "a" is an integer of 1 to 6. One exemplary group has the following formula:

—$(C_aF_{2a}O)_x$— wherein "a" is an integer of 1 to 6, and x is an integer of 5 to 600, preferably 10 to 400, and more preferably 30 to 200.

Examples of the repeating unit having the formula (—$C_aF_{2a}O$—) include:

—$CF_2O$—,

—$CF_2CF_2O$—,

—$CF_2CF_2CF_2O$—,

—$CF(CF_3)CF_2O$—,

—$CF_2CF_2CF_2CF_2O$—, and

—$CF_2CF_2CF_2CF_2CF_2CF_2O$—.

Of these, units of

—CF$_2$O—,

—CF$_2$CF$_2$O—,

—CF$_2$CF$_2$CF$_2$O—, and

—CF(CF$_3$)CF$_2$O— are preferred.

Notably, the repeating units in the divalent perfluoropolyether group may be composed of repeating units of one type or of two or more types.

The divalent perfluoropolyether group preferably contains any one of structures having the following formulae (10) to (13).

[Chem. 7]

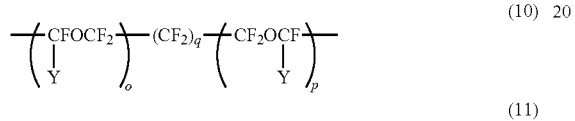
(10)

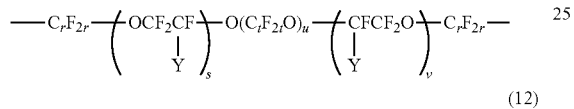
(11)

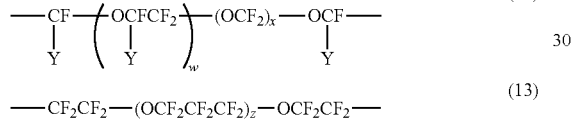
(12)

—CF$_2$CF$_2$—(OCF$_2$CF$_2$CF$_2$)$_z$—OCF$_2$CF$_2$—    (13)

Herein Y is fluorine or trifluoromethyl, o, p, and q are each an integer in the range of o≥0, p≥0, 0≤o+p≤202, specifically 2≤o+p≤150, and 0≤q≤6, r, s, t, u, and v are each an integer in the range of 0≤r≤3, 2≤t≤6, 0≤s≤100, 0≤v≤100, 2≤s+v≤100, 0≤u≤6, and s+u+v≤100, w and x are each an integer in the range of 1≤w≤100 and 1≤x≤100, and z is an integer of 1≤z≤200.

Examples of the divalent perfluoropolyether group Rf$^1$ in formula (1) include groups having the following formulae (14) to (21).

[Chem. 8]

(14)

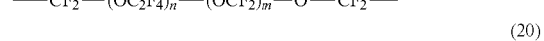
(15)

(16)

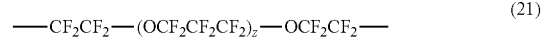
(17)

—CF$_2$O—(C$_2$F$_4$O)$_n$—CF$_2$—    (18)

—CF$_2$—(OC$_2$F$_4$)$_n$—(OCF$_2$)$_m$—O—CF$_2$—    (19)

(20)

—CF$_2$CF$_2$—(OCF$_2$CF$_2$CF$_2$)$_z$—OCF$_2$CF$_2$—    (21)

In formula (14), h, j, and k are each an integer in the range of h≥0, j≥0, 0≤h+j≤200, specifically 2≤h+j≤150, and 0≤k≤6. In formulae (15), (16), (17), (19), and (20), n is 1 to 100, m is 1 to 100, and n+m is 2 to 198. In formula (18), n is 2 to 200. In formula (21), z is 1 to 200.

Preferred examples of the linear fluorinated polymer having formula (1) include polymers having the following formulae (22) to (25).

[Chem. 9]

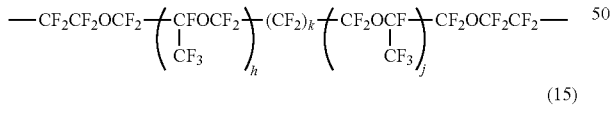
(22)

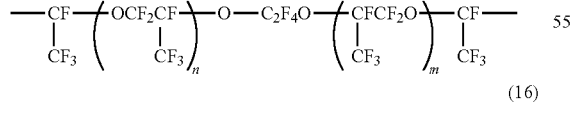
(23)

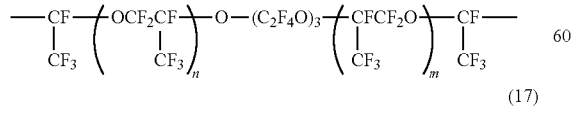
(24)

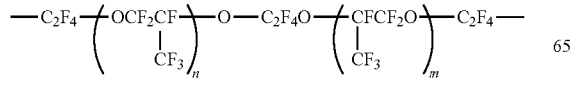
(25)

Herein m=1 to 100, n=1 to 100, and m+n=2 to 200.

The linear perfluoropolyether compound or fluorinated polymer of formula (1) should preferably have a number average molecular weight of 1,000 to 100,000, more preferably 1,500 to 50,000 as measured by gel permeation chromatography (GPC) versus polystyrene standards using a fluorochemical solvent as eluent. If the molecular weight is less than 1,000, a significant swell in gasoline and various solvents may be observable. If the molecular weight exceeds 100,000, too high a viscosity may interfere with working. Notably, the number average molecular weight (or number average degree of polymerization) may also be computed from a ratio of terminal structure/repeating unit structure as determined in $^{19}$F-NMR spectrum.

The azide-containing perfluoropolyether compound or fluorinated polymer of the general formula (1) used herein may be prepared, for example, by the following method, but the preparation method is not limited thereto.

The azide-containing fluorinated polymer having formula (1) may be obtained by reacting a molecular both end hydroxyalkyl-capped fluoropolymer having the following general formula (1A):

[Chem. 10]

HO-A-Rf$^1$-A-OH    (1A)

wherein Rf$^1$ and A are as defined above, at its hydroxy groups with a halogenated sulfonyl compound to form a molecular both end sulfonylester-capped fluoropolymer and then reacting the molecular both end sulfonylester-capped fluoropolymer at its sulfonylester groups with sodium azide in a mixture of a non-fluorinated organic solvent and an at least partially fluorinated organic solvent.

With reference to the general formula (1) wherein $Rf^1$ is a divalent perfluoropolyether group having formula (15) and A is methylene, the polymer may be prepared through the following steps.

First Step:

In the first step, a fluoropolymer capped with hydroxyalkyl groups such as hydroxymethyl at both ends of the molecular chain, for example, a fluoropolymer having the following formula is reacted with a sulfonyl halide compound, for example, perfluoro-1-butanesulfonyl fluoride in the presence of a base such as triethylamine to convert the hydroxy groups to sulfonylester groups, yielding a fluoropolymer having a sulfonylester group via an alkylene group such as methylene at each of the both ends of the molecular chain, for example, polymer having the main chain of hexafluoropropyleneoxide (HFPO) structure, represented by the following formula.

include p-toluenesulfonyl chloride, mesyl chloride, and p-nitrobenzenesulfonyl chloride as well as perfluoro-1-butanesulfonyl fluoride.

The base such as triethylamine is added for neutralizing the hydrogen halide which is formed during reaction of the hydroxy groups at the ends of the fluoropolymer with the sulfonyl halide compound. Thus, the base such as triethylamine is desirably used in an amount of 1.1 equivalents to 1.5 equivalents per equivalent of the hydroxy groups in the molecular both end hydroxyalkyl-capped fluoropolymer. Suitable bases used herein include diisopropylethylamine and pyridine as well as triethylamine.

The above reaction is preferably carried out under a nitrogen blanket. The reaction temperature may be about 20 to 50° C., specifically about 20 to 40° C. Since the reaction is exothermic immediately after the start, the reaction system is cooled for about 10 minutes when the temperature rises too high. Stirring is continued for about 1 hour to 3 days, specifically about 3 to 24 hours from the start of reaction until the reaction is completed. At the end of reaction, the triethylamine hydrofluoride formed by the reaction is dissolved in water. The fluorinated organic solvent layer is recovered and concentrated in vacuum, yielding a fluoropolymer having a sulfonylester group via methylene at each of the molecular chain ends.

[Chem. 11]

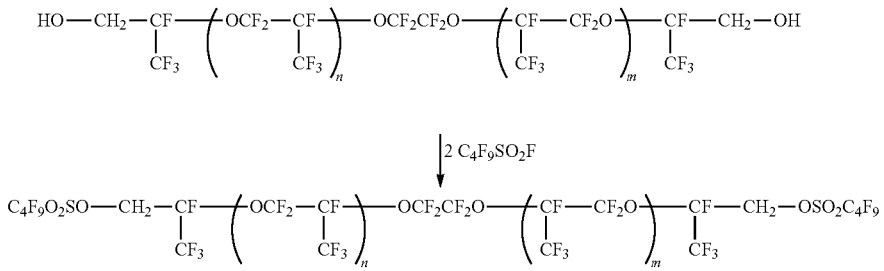

Herein n, m, and n+m are as defined above.

When a molecular both end hydroxyalkyl-capped fluoropolymer based on the main chain selected from skeletons of the general formulae (14), (16) to (21) is used as the fluoropolymer capped with hydroxyalkyl groups such as hydroxymethyl at both ends of the molecular chain instead of the fluoropolymer based on the main chain of hexafluoropropyleneoxide (HFPO) structure having the general formula (15), there is obtained a sulfonylester-containing polymer having a corresponding main chain structure.

In the above reaction, the sulfonyl halide compound is preferably used in an amount of at least 1.0 equivalent, more preferably 1.0 equivalent to 5.0 equivalents per equivalent of the hydroxy groups in the molecular both end hydroxyalkyl-capped fluoropolymer. Suitable sulfonyl halide compounds Second Step:

In the second step, a fluoropolymer having a sulfonylester group via an alkylene group such as methylene at each of the molecular chain ends obtained in the first step, for example, a polymer based on the main chain of hexafluoropropyleneoxide (HFPO) structure, represented by the following formula, at its sulfonylester groups is reacted with sodium azide in a mixture of an at least partially fluorinated organic solvent and a non-fluorinated organic solvent, yielding a target azide-containing fluoropolymer having an azide group via an alkylene group such as methylene at each of the molecular chain ends, represented by the general formula (1), for example, azide-containing polymer based on the main chain of HFPO structure, represented by the following formula.

[Chem. 12]

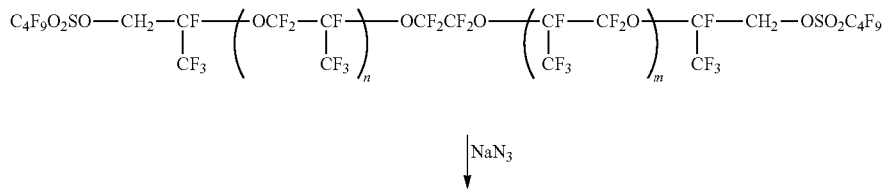

-continued

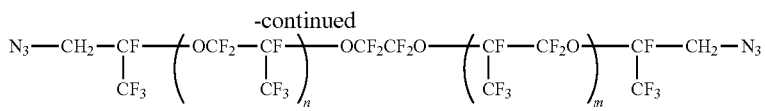

Herein n, m, and n+m are as defined above.

In the above reaction, sodium azide is desirably used in an amount of at least 1.0 equivalent, more desirably 1.1 equivalents to 3.0 equivalents per equivalent of the sulfonylester groups in the sulfonylester-containing fluoropolymer. If the amount of sodium azide is too small, the reaction may not take place to a full extent. If the amount of sodium azide is too large, there arises a risk of explosion during separatory operation because a noticeable amount of sodium azide is left behind after the completion of reaction.

The non-fluorinated organic solvent is preferably dimethyl sulfoxide (DMSO), N,N-dimethylformamide (DMF) or acetonitrile. The non-fluorinated organic solvent is preferably used in an amount of at least 0.5 time, more preferably 1.5 times to 2.5 times the weight of the fluoropolymer having a sulfonylester group via an alkylene group such as methylene at each of the molecular chain ends. Too small amounts of the non-fluorinated organic solvent may lead to a decline of the reaction rate and invite side reactions.

The at least partially fluorinated organic solvent is desirably one capable of dissolving the sulfonylester-containing fluoropolymer, such as hexafluoro-m-xylene (HFMX), H Galden ZV130 (Solvay S.A.) or AC-6000 (Asahi Glass Co., Ltd.). The at least partially fluorinated organic solvent is preferably used in an amount of at least 0.5 time, more preferably 1.5 times to 2.5 times the weight of the fluoropolymer having a sulfonylester group via an alkylene group such as methylene at each of the molecular chain ends. Too small amounts of the at least partially fluorinated organic solvent may also lead to a decline of the reaction rate and invite side reactions.

The at least partially fluorinated organic solvent and the non-fluorinated organic solvent are preferably used in a weight ratio of from 0.5:1 to 3:1, more preferably from 1:1 to 2:1, and most preferably 1:1. If the ratio of the at least partially fluorinated organic solvent is too low, the reaction rate of azidation may decrease and side reactions take place. Likewise, if the ratio of the at least partially fluorinated organic solvent is too high, the reaction rate of azidation may decrease and side reactions take place.

The above reaction is performed by adding an at least partially fluorinated organic solvent, a non-fluorinated organic solvent, and sodium azide to the fluoropolymer having a sulfonylester group via an alkylene group such as methylene at each of the molecular chain ends and heating them at a temperature of 60 to 120° C., specifically 80 to 115° C. for about 12 hours to 3 days, specifically about 1 to 2.8 days. After the completion of reaction, water and an at least partially fluorinated organic solvent such as hexafluoro-m-xylene (HFMX) are added. The water layer is removed by separatory operation. An organic solvent such as acetone is added for precipitation. The precipitated product is collected, concentrated in vacuum, and treated with activated carbon, yielding a target perfluoropolyether compound (fluoropolymer) having an azide group via an alkylene group such as methylene at each of the molecular chain ends, represented by the general formula (1).

[Component (b)]

Component (b) used herein is a linear perfluoropolyether compound containing at least three ethynyl (—C≡C—H) groups as terminal alkyne per molecule, which is a crosslinker.

Specifically, component (b) is preferably a perfluoropolyether compound having the following general formula (2).

[Chem. 13]

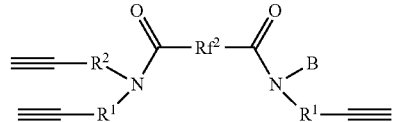

(2)

The compound is characterized by having a divalent perfluoropolyether group represented by $Rf^2$ and at least three ethynyl (—C≡C—H) groups as terminal alkyne per molecule which are bonded to the both ends of the divalent perfluoropolyether group $Rf^2$ each via an amide bond (—CON=).

In formula (2), $R^1$ and $R^2$ are each independently a divalent straight or branched aliphatic saturated hydrocarbon group or arylene group. Preferred examples of the divalent straight hydrocarbon group include straight aliphatic saturated hydrocarbon groups of 1 to 10 carbon atoms such as methylene, ethylene, propylene, butylene, octylene, and decylene. Preferred examples of the divalent branched hydrocarbon group include branched aliphatic saturated hydrocarbon groups of 2 to 10 carbon atoms such as 1-methylmethylene, 1-methylethylene, 1,2-dimethylethylene, 1-ethylpropylene, 1,2-diethylpropylene, and 1,2,3-triethylbutylene. Preferred examples of the arylene group include phenylene groups of the structure having the general formulae (4) to (6) and arylene groups of the structure having the general formulae (7) to (9) other than the above phenylene groups (that is, the arylene groups of the general formulae (7) to (9) refer to phenylene groups in which one hydrogen atom on the aromatic ring is substituted by ethynyl).

Of these, divalent straight hydrocarbon groups of 1 to 4 carbon atoms, phenylene groups having the general formulae (4) to (6), and arylene groups having the general formulae (7) to (9) other than the above phenylene groups are more preferred.

[Chem. 14]

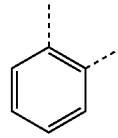

(4)

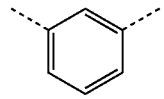

(5)

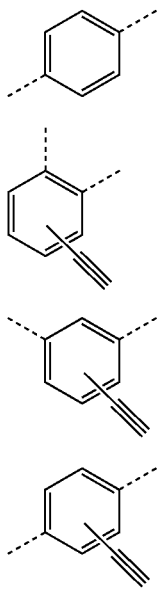

(6)

(7)

(8)

(9)

Herein the broken line designates a valence bond.

In formula (2), $R^1$ may have any one of the foregoing structures or a combination of two or more structures. $R^2$ has any one of the foregoing structures and may be the same as or different from $R^1$.

In formula (2), B is hydrogen, phenyl, a monovalent straight or branched aliphatic unsaturated hydrocarbon group or a group having the following general formula (3):

[Chem. 15]

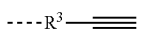

(3)

wherein $R^3$ is as defined for $R^1$ and $R^2$ in formula (2) and the broken line designates a valence bond.

The monovalent straight or branched aliphatic unsaturated hydrocarbon group is preferably an aliphatic unsaturated bond-containing monovalent hydrocarbon group of 2 to 8 carbon atoms, more preferably of 2 to 6 carbon atoms, exclusive of the group having formula (3). Examples include ethynyl, and alkenyl groups such as vinyl, allyl, propenyl, isopropenyl, butenyl, isobutenyl, and hexenyl, with ethynyl being preferred.

$R^3$ is preferably selected from divalent straight aliphatic saturated hydrocarbon groups of 1 to 10 carbon atoms, divalent branched aliphatic saturated hydrocarbon groups of 2 to 10 carbon atoms, and arylene groups having the general formulae (4) to (9) (that is, phenylene groups having the general formulae (4) to (6) and arylene groups having the general formulae (7) to (9) other than the above phenylene groups), more preferably divalent straight hydrocarbon groups of 1 to 10 carbon atoms and arylene groups having the general formulae (4) to (9), and even more preferably divalent straight hydrocarbon groups ranging from methylene (C1) to butylene (C4) and arylene groups having the general formulae (4) to (9). If $R^3$ is a straight aliphatic saturated hydrocarbon group of more than 10 carbon atoms, the fluorine-containing alkyne compound may be prone to swell in polar solvents and may not exert organic solvent resistance inherent to the main chain structure. Notably, while $R^3$ having any one of the foregoing structures may be the same as or different from $R^1$ and/or $R^2$, $R^3$ is preferably the same as $R^1$ and/or $R^2$.

$R^1$ and $R^2$ on the left in formula (2), and $R^1$ and B (or $R^3$ when B is a group of formula (3)) on the right in formula (2) may be linked via a chemical bond (single or double bond) to form a cyclic structure attached to the corresponding nitrogen atom. In this case, examples of the structure bonded to the end of $Rf^2$ are shown below.

[Chem. 16]

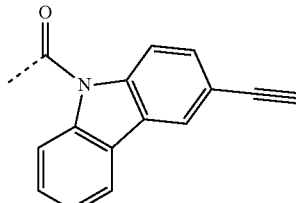

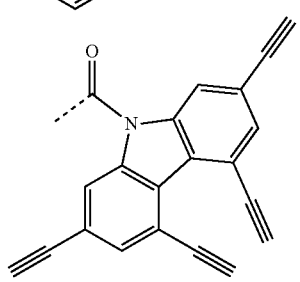

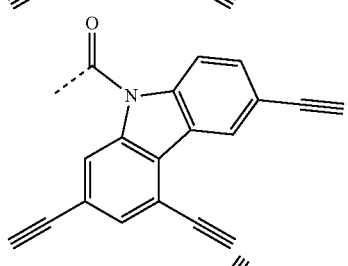

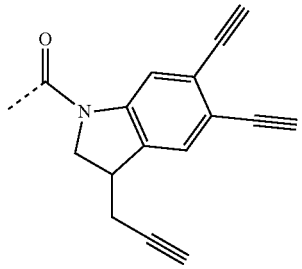

Herein the broken line designates a valence bond.

In formula (2), $Rf^2$ (divalent perfluoropolyether group) may be the same as $Rf^1$ in formula (1).

Examples of $Rf^2$ include groups having the following formulae (26) to (28) as well as the groups having the above formulae (14) to (21).

[Chem. 17]

(26)

(27)

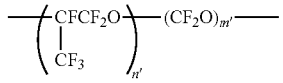

(28)

In formulae (26) and (27), n' and m' are each independently an integer in the range of n'≥1, m'≥1, and 2≤n'+m'≤150; n' is preferably 1≤n'≤50, more preferably 15≤n'≤40, m' is preferably 1≤m'≤50, more preferably 15≤m'≤40, and n'+m' is preferably 5≤n'+m'≤100, more preferably 35≤n'+m'≤80.

In formula (28), z' is an integer of 1 to 150, preferably 1 to 100, and more preferably 6 to 80.

Preferred examples of the linear fluorine-containing alkyne compound having formula (2) include compounds having the following formulae (29) and (30).

[Chem. 18]

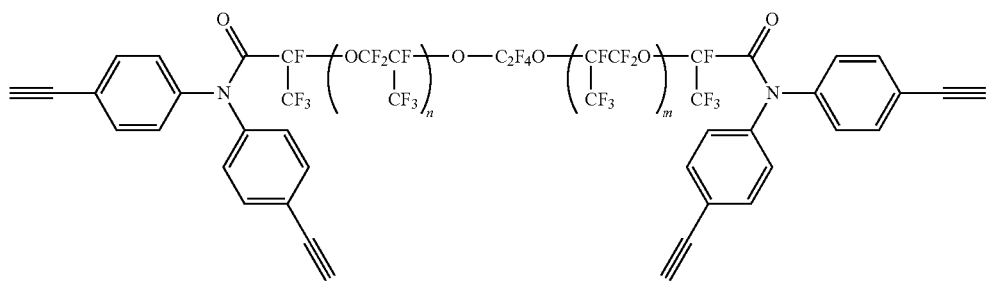

(29)

(30)

Herein m is an integer of 1 to 100, n is an integer of 1 to 100, and m+n is 2 to 200.

In the perfluoropolyether-based rubber composition of the invention, component (b) is added in such an amount that the molar amount of total ethynyl (—C≡C—H) groups in component (b) is preferably 0.5 to 2.0 moles per mole of total azide groups in component (a) (i.e., such an amount that a molar ratio of ethynyl groups in component (b) to azide groups in component (a) is from 0.5 to 2.0), more preferably 0.6 to 1.5 moles, and even more preferably 0.8 to 1.2 moles per mole of total azide groups in component (a). With less than 0.5 mole of ethynyl groups in component (b) per mole of azide groups in component (a), the composition may become gel-like or liquid rather than forming a rubber-like product. With more than 2.0 moles of ethynyl groups in component (b) per mole of azide groups in component (a), the composition may also become gel-like or liquid rather than forming a rubber-like product.

The perfluoropolyether compound having the general formula (2) used herein may be prepared, for example, by the following method. A dicarbonyl compound having the following general formula (2A) is reacted with an alkyne derivative having a primary amino group to prepare an intermediate product having the following general formula (2B). The intermediate product is in turn reacted with an alkyne derivative having a leaving group, yielding a perfluoropolyether compound (fluorine-containing alkyne compound) having formula (2).

[Chem. 19]

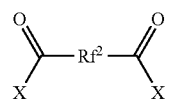

(2A)

[Chem. 20]

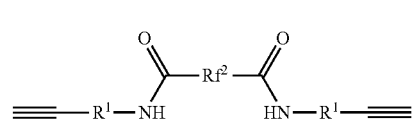

(2B)

$R^1$ and $Rf^2$ in formulae (2A) and (2B) are as defined for $R^1$ and $Rf^2$ in formula (2). Specifically, in formulae (2A) and (2B), $R^1$ is a divalent straight or branched aliphatic saturated hydrocarbon group or arylene group, and $Rf^2$ is a divalent perfluoropolyether group. X in formula (2A) is a halogen atom, preferably fluorine, chlorine, bromine or iodine, more preferably fluorine.

One preferred method of preparing the perfluoropolyether compound (fluorine-containing alkyne compound) used herein includes preparing steps which are described below.

(Step 1)

[Chem. 21]

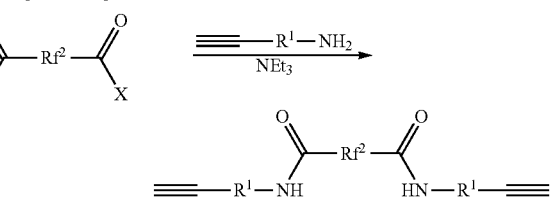

(Step 2)

[Chem. 22]

-continued

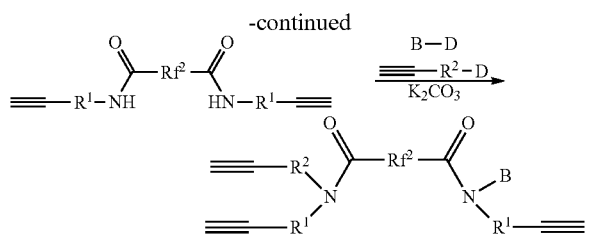

In the reaction formulae of Steps 1 and 2, $R^1$, $Rf^2$, and $X$ are as defined for $R^1$, $Rf^2$, and $X$ in formulae (2A) and (2B). $R^2$ is a divalent straight or branched aliphatic saturated hydrocarbon group or arylene group, which are as defined for $R^2$ in formula (2). B is hydrogen, phenyl, a monovalent straight or branched aliphatic unsaturated hydrocarbon group or a group having the general formula (3), preferably a group having the general formula (3). B is as defined for B in formula (2). D is a leaving group.

In Step 1, the dicarbonyl compound having the general formula (2A) is reacted at its terminal C(=O)X groups with an alkyne derivative having a primary amino group to prepare an alkyne compound or intermediate product having the general formula (2B). The reaction is preferably performed in the presence of a base compound as exemplified by triethylamine, diisopropylethylamine or pyridine.

Suitable primary amino-containing alkyne derivatives which can be used in the reaction include, for example, aminoalkynes such as propargylamine, 4-amino-1-butyne, 5-amino-1-pentyne, and 6-amino-1-hexyne, ethynylanilines such as 3-ethynylaniline, 4-ethynylaniline, and 2-ethynylaniline, and hydrochlorides thereof. The primary amino-containing alkyne derivative is preferably used in an amount of at least 1.2 equivalents per equivalent of the terminal C(=O)X groups in the dicarbonyl compound capped with C(=O)X groups at both ends of the molecular chain.

For neutralizing the hydrogen halide which is formed during the reaction of the terminal C(=O)X groups in the dicarbonyl compound having the general formula (2A) with the primary amino-containing alkyne derivative, a base compound such as triethylamine, diisopropylethylamine or pyridine may be added to the reaction system of Step 1. When triethylamine is added, the amount of triethylamine is preferably at least 1.1 equivalents per equivalent of the terminal C(=O)X groups in the dicarbonyl compound capped with C(=O)X groups at both ends of the molecular chain. When the primary amino-containing alkyne derivative is a hydrochloride, however, an excess amount of triethylamine is necessary for neutralizing the hydrochloride. In this case, the amount of triethylamine used is preferably at least 2.2 equivalents per equivalent of the terminal C(=O)X groups in the dicarbonyl compound having the general formula (2A).

When the primary amino-containing alkyne derivative is solid, it may be dissolved in a small amount of organic solvent and added dropwise to the system containing the dicarbonyl compound having the general formula (2A). Examples of the organic solvent which can be used herein include acetone, methyl ethyl ketone, tetrahydrofuran (THF), diethyl ether, dibutyl ether, 1,4-dioxane, ethyl acetate, and N,N-dimethylformamide. Preferred are THF, diethyl ether, dibutyl ether, and 1,4-dioxane.

The reaction in Step 1 is preferably carried out in a nitrogen atmosphere. First, the primary amino-containing alkyne derivative is added dropwise to the system containing the dicarbonyl compound having the general formula (2A). The temperature during dropwise addition is up to 40° C., preferably up to 20° C. Since the reaction is exothermic immediately after the start, the dropwise addition is interrupted and the system is cooled when the temperature rises too high. After the completion of dropwise addition of the primary amino-containing alkyne derivative, the mixture is aged at room temperature overnight or so. At the end of reaction, the formed triethylamine hydrogen halide salt and the unreacted primary amino-containing alkyne derivative having an ethynyl group are each removed. The remaining portion is finally treated with activated carbon, yielding an intermediate product having the general formula (2B).

In Step 2, the alkyne compound having the general formula (2) is prepared by reacting the intermediate product having the general formula (2B) obtained in Step 1 with a leaving group-containing alkyne derivative (H—C≡C—$R^2$-D) and a specific leaving group-containing compound (B-D). The leaving group D on the alkyne derivative is preferably halogeno, more preferably bromo, iodo or chloro.

In the reaction, examples of the alkyne derivative having a leaving group D include $C_3$-$C_6$ halogenated alkynes such as 3-bromo-1-propyne, 3-iodo-1-propyne, 4-bromo-1-butyne, 4-chloro-1-butyne, 4-iodo-1-butyne, 5-bromo-1-pentyne, 5-chloro-1-pentyne, 5-iodo-1-pentyne, 6-bromo-1-hexyne, 6-chloro-1-hexyne, and 6-iodo-1-hexyne. The leaving group-containing alkyne derivative is used in an amount of at least 1.2 equivalents, preferably at least 3.0 equivalents per equivalent of N—H in the intermediate product having the general formula (2B).

The specific compound having a leaving group D is preferably an alkyne derivative having a leaving group D.

In Step 2, a base compound such as potassium carbonate, cesium carbonate, sodium hydroxide, lithium hydroxide, potassium hydroxide, triethylamine or diisopropylethylamine may be added during the reaction of the intermediate product having the general formula (2B) with a leaving group-containing alkyne derivative and a specific compound having a leaving group. When added, the amount of the base compound is at least 1.1 equivalents, preferably at least 6 equivalents per equivalent of N-H in the alkyne compound or intermediate product having the general formula (2B).

Also, a solvent may be used in the reaction of Step 2. Although the solvent used herein is not particularly limited, it is preferably a fluorochemical solvent or polar organic solvent. Suitable fluorochemical solvents include 1,3-bis(trifluoromethyl)benzene and trifluoromethylbenzene. Suitable polar organic solvents include acetone, methyl ethyl ketone, DMSO, and N,N-dimethylformamide.

The reaction of Step 2 is preferably carried out in a nitrogen atmosphere. First, the intermediate product having the general formula (2B) obtained in Step 1 is reacted with an alkyne derivative having a leaving group D and a specific compound having a leaving group, preferably in the presence of potassium carbonate. The reaction temperature is preferably at least 50° C., more preferably at least 70° C. At the end of reaction, the reaction mixture is filtered to remove the potassium carbonate and concentrated in vacuum. By removing the unreacted alkyne derivative having a leaving group D, the unreacted specific compound having a leaving group, and by-products, there is obtained a perfluoropolyether compound (alkyne compound) having the general formula (2).

The above method of preparing a fluorine-containing alkyne compound is successful in efficiently producing a perfluoropolyether compound having the general formula (2) without a need for complex preparing steps.

Another preferred method of preparing the perfluoropolyether compound (fluorine-containing alkyne compound) used herein includes preparing steps which are described below.

[Chem. 23]

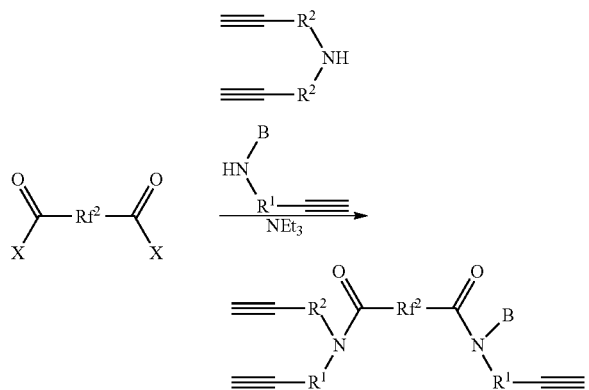

Perfluoropolyether compounds (fluorine-containing alkyne compounds) having formula (2), for example, a perfluoropolyether compound of formula (2) wherein $R^1$ and $R^2$ are an arylene group, but not a divalent straight or branched aliphatic saturated hydrocarbon group and B is phenyl or a group having formula (3), but not hydrogen or a monovalent straight or branched aliphatic unsaturated hydrocarbon group, with the proviso that $R^3$ is an arylene group, but not a divalent straight or branched aliphatic saturated hydrocarbon group and a perfluoropolyether compound of formula (2) wherein $R^1$ and $R^2$ on the left, and $R^1$ and B (or $R^3$ when B is a group of formula (3)) on the right are linked via a chemical bond (single or double bond) to form a cyclic structure attached to the corresponding nitrogen atom, may be obtained by reacting a dicarbonyl compound having the general formula (2A) with an alkyne derivative having $R^1$ and $R^2$ which are bonded to nitrogen and an alkyne derivative having $R^1$ and B which are bonded to nitrogen.

The perfluoropolyether compound (fluorine-containing alkyne compound) having formula (2) can be prepared by the same method as the preparation method involving the step of forming the intermediate product having the general formula (2B) aside from using the alkyne derivatives defined above.

The methods of preparing a perfluoropolyether compound having the general formula (2), described above, are merely exemplary and not limiting.

As long as the perfluoropolyether-based rubber composition of the invention contains components (a) and (b), it is a heat curable perfluoropolyether-based rubber composition which is heat cured into a cured product.

[Component (c)]

Preferably the perfluoropolyether-based rubber composition further comprises a transition metal catalyst as component (c). Inclusion of component (c) turns a perfluoropolyether-based rubber composition into a room temperature-curable perfluoropolyether-based rubber composition which can be cured at room temperature (23° C.±10° C.).

Examples of component (c) include transition metal complexes, especially complexes containing elements such as copper, ruthenium, and silver, with complexes containing copper element being preferred. Suitable complexes containing copper element used herein include copper complexes containing halide ions, copper complexes of acetonitrile and phosphorus or boron-based anions, copper complexes containing a sulfate ion, and copper complexes containing an acetate ion. Preferred are copper iodide, copper chloride, copper bromide, copper acetate, copper sulfate, tetrakisacetonitrile copper hexafluorophosphate, and tetrakisacetonitrile copper tetrafluoroborate. Notably, component (c) used herein may be either anhydride or hydrate.

Since component (c) is often available in powder form, it may be dissolved in a solvent prior to use, if necessary. Examples of the solvent used herein include polar organic solvents and water. The solvent is not particularly limited as long as component (c) is dissolved therein. Preferred examples of the polar organic solvent include dimethylsulfoxide (DMSO), N,N-dimethylformamide (DMF), acetonitrile, tetrahydrofuran (THF), and ethanol. DMSO and DMF are more preferred.

Component (c) is added in such an amount that a ratio of the amount (mol) of transition metal in component (c) to the amount (mol/100 g) of azide groups in component (a) may preferably range from 1 to 300 mol %, more preferably from 5 to 200 mol %, and even more preferably from 30 to 150 mol %. As the amount of component (c) added is increased, the curing time is shorter and the cured product is more readily formed. However, if the amount of component (c) is too much, particles of component (c) may emerge on the surface of the cured product, detracting from the outer appearance. If the amount of component (c) is too small, crosslinking by way of triazole structure formation, which is necessary for curing, may hardly take place and the product may become gel-like or liquid.

[Other Components]

Other components which can be used herein include
substances for reducing component (c) (especially copper complexes or copper salts),
nitrogen-based ligands for activating crosslinking reaction, and
inorganic fillers.

[Substance for Reducing Copper Salt]

Huisgen cycloaddition reaction (click reaction) starts with reaction of monovalent copper with acetylene. However, since monovalent copper is often unstable, it is sometimes oxidized in part into inert divalent copper as by-product. This suggests that once a reducing agent is added to reduce the copper from divalent to monovalent form, the copper resumes a reactive catalyst function again. Suitable substances for reducing component (c), especially copper complex include sodium ascorbate and ascorbic acid. Since these substances are in powder or granular form, they may be dissolved in a suitable solvent prior to addition. The type of solvent is not particularly limited as long as the above compound is dissolvable therein. The compound is preferably added in an amount (mol) of 0.5 to 5.0 times, more preferably 1.0 to 3.0 times, and even more preferably 1.0 to 2.0 times the amount (mol) of component (c) added.

[Nitrogen-Based Ligand for Activating Crosslinking Reaction]

It is known that Huisgen cycloaddition reaction (click reaction) is activated by adding a nitrogen-based compound (ligand) which coordinates to the copper salt so that the reaction is completed in a shorter time. Therefore, the curing time can sometimes be reduced by adding the nitrogen-based compound (ligand) to the room temperature curable perfluoropolyether-based rubber composition comprising component (c). Suitable nitrogen-based ligands for activating crosslinking reaction include compounds having at least one skeleton selected from primary amines, secondary amines, tertiary amines, imidazoles, and triazoles. Preferred are tris[(1-benzyl-1H-1,2,3-triazol-4-yl)methyl]amine, tris(2-benzimidazolylmethyl)amine, tris(3-hydroxypropyltriazolylmethyl)amine, bathophenanthrolinedisulfonic acid disodium salt hydrate, N-(2-aminoethyl)thioacetamide trifluoroacetate, and L-histidine. Of these compounds, those in powder or granular form may be dissolved in a suitable solvent prior to addition. The type of solvent is not particularly limited as long as the above compound is dissolvable therein. The compound is preferably added in an amount of 0.5 to 5.0 equivalents, more preferably 1.0 to 3.0 equivalents, and even more preferably 1.0 to 2.0 equivalents per mole of component (c) used.

[Inorganic Filler]

Examples of the inorganic filler include various powder metal oxides such as iron oxide, zinc oxide, titanium oxide, and alumina, various metal carbonates such as calcium carbonate, magnesium carbonate, and zinc carbonate, carbon black, and various silica-based fillers such as fumed silica (dry silica), wet silica (precipitated silica and sol-gel silica), ground silica, fused silica, crystalline silica (quartz powder), and diatomaceous earth. The addition of the inorganic filler enables to adjust the hardness and mechanical strength of a cured product of the inventive composition. Also, ion exchange resins such as hydrotalcite, hollow inorganic fillers, and rubber-like spherical fillers may be added.

[Usage]

The perfluoroether-based rubber composition of the invention is obtained as one-part type composition by intimately mixing components (a) and (b). Alternatively, the composition may be constructed as two-part type composition wherein components (a) and (b) are kept separate. In this case, they may be mixed for use when needed. When the room temperature-curable perfluoropolyether-based rubber composition of the invention is constructed as two-part type composition wherein components (a) and (b) are kept separate, component (c) may be combined with either component (a) or component (b), or with both component (a) and component (b).

[Cured Product]

The perfluoropolyether-based rubber cured product of the invention may be obtained by heat curing the inventive perfluoropolyether-based rubber composition comprising components (a) and (b) in such amounts that the amount of ethynyl groups in component (b) is predetermined moles, specifically 0.5 to 2.0 moles per mole of total azide groups in component (a), at 100° C. to 150° C. preferably for about 1.5 to 9 hours.

When component (c) is added to the composition in order that the composition cure at room temperature, the composition turns to a room temperature-curable composition, which cures at room temperature (5 to 40° C.), preferably for about one day to about one week, into the inventive perfluoropolyether-based rubber cured product. While the inventive perfluoropolyether-based rubber composition which is curable at room temperature finds use in a wide variety of perfluoropolyether-based rubber applications, it is particularly useful in such applications as large-size parts which are too large to place in heating ovens or heat-sensitive parts that should not be heated because of their relationship to the surrounding members.

Since the inventive perfluoropolyether-based rubber cured products exhibit improved heat resistance, low-temperature properties, solvent resistance, oil resistance, and chemical resistance, especially acid resistance, they are useful as articles which must be heat resistant and especially acid resistant.

Specifically, the cured products may be used as rubber parts in automobiles where oil resistance is required, for example, diaphragms, valves, and sealing materials; rubber parts in chemical plants, for example, pump diaphragms, valves, hoses, oil seals, gaskets, and sealing materials such as tank conduit repairing sealing materials; rubber parts in inkjet printers; rubber parts in semiconductor manufacturing lines, for example, diaphragms, valves, and sealing parts such as gaskets in equipment which come in contact with chemicals, and valves requiring low friction and wear resistance; rubber parts in analytical and scientific instruments, for example, pump diaphragms, valves, and sealing parts (gaskets); rubber parts in medical equipment, for example, pumps, valves, and joints; rubber parts in residential environment; rubber parts in aircraft; tent coating materials; sealants; molded parts; extruded parts; coats; copier roll materials; electrical moisture-proof coating materials; sensor potting materials; fuel cell sealing materials; machine tool sealing materials; laminate rubber fabrics; and the like.

EXAMPLES

Examples and Comparative Examples are given below for illustrating the invention, but the invention is not limited thereto.

Synthesis Example A1

A 3-L flask was charged with 1,045 g of a fluoropolymer based on the main chain of pentatriacontamer HFPO skeleton and having hydroxymethyl groups at both ends of the molecular chain (hydroxy concentration: $0.30 \times 10^{-3}$ mol/g), represented by the following formula (31).

[Chem. 24]

$$HO-CH_2-CF(CF_3)-(OCF_2CF(CF_3))_n-OCF_2CF_2O-(CFCF_2O)_m-CF(CF_3)-CH_2-OH \quad (31)$$

(Herein m + n ≈ 35)

Under nitrogen blanket, 389 g of perfluoro-1-butanesulfonyl fluoride and 46 g of triethylamine were added to the flask and stirring was started. Then, the internal temperature of the system rose to 30° C. at the highest. After about 20 hours of stirring, hexafluoro-m-xylene (HFMX) and water were added. The HFMX layer was recovered by separatory operation. Acetone was added to the HFMX layer, from which the product precipitated. The product was collected and concentrated in vacuum (267 Pa) at 100° C. for 1 hour, yielding 1,128 g of a colorless clear fluoropolymer having the following formula (32).

[Chem. 25]

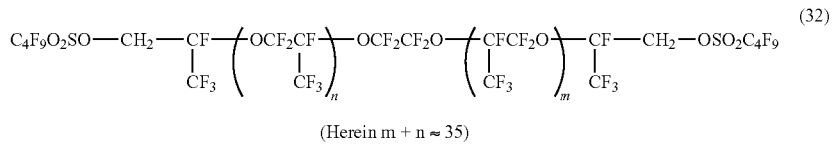

(32)

(Herein m + n ≈ 35)

A fluoropolymer having formula (32) was separately prepared in the same manner as above. A portion (1.0105 g) of the fluoropolymer was sampled and mixed with 0.0535 g of toluene and 4.0084 g of HFMX. The resulting solution was analyzed by $^1$H-NMR, from which the $-OSO_2C_4F_9$ content of the polymer having formula (32) was computed to be $0.278\times10^{-3}$ mol/g.

$^1$H-NMR
δ 4.69 (m, $-CH_2$)

A 10-L flask was charged with 1,128 g of the fluoropolymer having formula (32) and 1,692 g of DMSO and purged with nitrogen for 10 minutes. Under nitrogen blanket, 1,692 g of HFMX and 60 g of sodium azide were added to the flask. The system was heated at 110° C. and stirring was started. After 66.5 hours of stirring, water was added to quench the reaction. HFMX was added to the system, from which the HFMX layer was recovered by separatory operation. Acetone was added to the recovered HFMX layer for precipitation. The precipitated product was collected, filtered, and concentrated in vacuum (267 Pa) at 100° C. for about 1 hour. To the concentrated product, 1,018 g of a fluorochemical solvent (trade name PF-5060 from 3M Company) and 51 g of activated carbon (SHIRASAGI AS from Osaka Gas Chemicals Co., Ltd.) were added. The mixture was stirred at room temperature for 1 hour, filtered to remove the activated carbon, and concentrated in vacuum (267 Pa) at 100° C. for about 1 hour, yielding 960 g of a colorless clear azide-containing fluoropolymer having the following formula (33) (number average molecular weight: 6,114).

[Chem. 26]

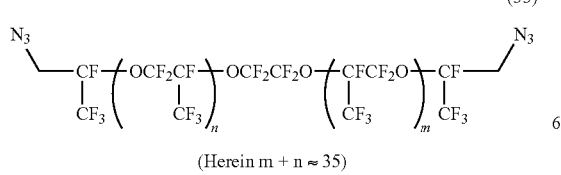

(33)

(Herein m + n ≈ 35)

A portion (1.0083 g) of the azide-containing fluoropolymer having formula (33) was sampled and mixed with 0.0508 g of toluene and 4.0031 g of HFMX. The resulting solution was analyzed by $^1$H-NMR, from which the azide content of the fluoropolymer having formula (33) was computed to be $0.274\times10^{-3}$ mol/g.

$^1$H-NMR
δ 3.56 (m, $-CH_2$)

Synthesis Example A2

The same procedure as in Synthesis Example A1 was repeated except that 1,045 g of a fluoropolymer of formula (31) (hydroxy concentration: $0.13\times10^{-3}$ mol/g) in which the number of repeating HFPO units in its main chain was 94 units (m+n=~94) was used instead of 1,045 g of the fluoropolymer based on the main chain of pentatriacontamer HFPO skeleton (m+n=~35), represented by formula (31), in Synthesis Example A1. There was obtained 1,050 g of a colorless clear polymer having formula (34).

[Chem. 27]

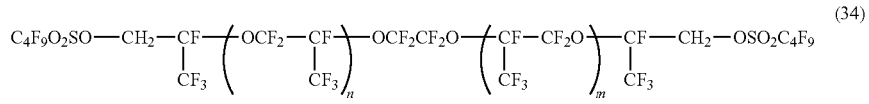

(34)

(Herein m + n ≈ 94)

The same procedure as in Synthesis Example A1 was repeated except that 1,050 g of the resulting polymer having formula (34) was azidized in a mixture of 2,100 g of DMSO and 1,050 g of HFMX, yielding an azide-containing fluoropolymer having the following formula (35) (colorless clear, number average molecular weight: 15,860, azide content: $0.116\times10^{-3}$ mol/g).

[Chem. 28]

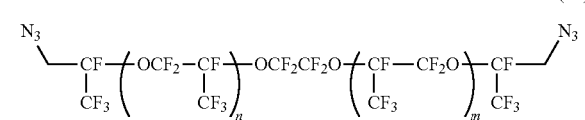

(35)

(Herein m + n ≈ 94)

Synthesis Example A3

A 3-L flask was charged with 1,023 g of a fluoropolymer based on the main chain of perfluoropolyether groups and having hydroxymethyl groups at both ends of the molecular chain (hydroxy concentration: $1.19\times10^{-3}$ mol/g), represented by the following formula (36).

[Chem. 29]

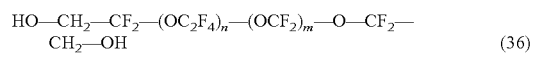

$HO-CH_2-CF_2-(OC_2F_4)_n-(OCF_2)_m-O-CF_2-CH_2-OH$ (36)

(Herein m+n≈18)

Under nitrogen blanket, 736 g of perfluoro-1-butanesulfonyl fluoride and 148 g of triethylamine were added to the flask and stirring was started. After about 19.5 hours of stirring, HFMX and water were added, from which the HFMX layer was recovered by separatory operation. The HFMX layer was dried over magnesium sulfate and filtered. The filtrate was concentrated in vacuum (267 Pa) at 100° C. for 1 hour, yielding 1,230 g of a colorless clear fluoropolymer having the following formula (37).

[Chem. 30]

$$OSO_2C_4F_9-CH_2-CF_2-(OC_2F_4)_n-(OCF_2)_m-O-CF_2-CH_2-OSO_2C_4F_9 \quad (37)$$

(Herein m+n≈18)

As in Synthesis Example A1, the fluoropolymer having formula (37) was analyzed by $^1$H-NMR, from which the —OSO$_2$C$_4$F$_9$ content of the polymer having formula (37) was computed to be $1.10 \times 10^{-3}$ mol/g.

A 10-L flask was charged with 1,208 g of the fluoropolymer having formula (37) and 1,812 g of DMSO and purged with nitrogen for 10 minutes. Under nitrogen blanket, 1,812 g of HFMX and 156 g of sodium azide were added to the flask. The system was heated at 110° C. and stirring was started. After 21 hours of stirring, water was added to quench the reaction. A fluorochemical solvent (trade name PF-5060 from 3M Company) was added, from which the PF-5060 layer was recovered by separatory operation. Acetone was added to the recovered PF-5060 layer for washing the PF-5060 layer. The PF-5060 layer as filtrate (1) and the acetone layer as filtrate (2) were separately recovered. Filtrate (1) was dried over anhydrous magnesium sulfate, filtered, and concentrated in vacuum (267 Pa) at 100° C. for 1 hour, yielding a colorless clear oil as product (1). Filtrate (2) was concentrated in vacuum (2,670 Pa) at 50° C. for 1.5 hours. To the residue, 1,000 g of PF-5060 and 100 g of acetone were added. The PF-5060 layer was recovered by separatory operation. The recovered PF-5060 layer was dried over anhydrous magnesium sulfate, filtered, and concentrated in vacuum (267 Pa) at 100° C. for 1 hour, yielding a colorless clear oil as product (2). The resulting products (1) and (2) were combined, which yielded 988 g of an azide-containing fluoropolymer having the following formula (38) in colorless clear form (number average molecular weight: 1,722, azide content: $1.08 \times 10^{-3}$ mol/g).

[Chem. 31]

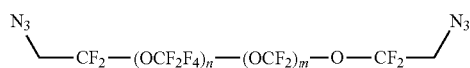

(Herein m + n ≈ 18)

Synthesis Example B1

Step 1:

A 300-mL flask was charged with 209 g of perfluoropolyether having the following formula (39) (C(=O)F content: $0.300 \times 10^{-3}$ mol/g) and purged with nitrogen. The system was cooled at a temperature of ~10° C. In a nitrogen atmosphere, a solution of 8.80 g (0.075 mol) of 4-ethylaniline and 7.00 g (0.069 mol) of triethylamine in tetrahydrofuran (THF) was added dropwise to the system over 30 minutes such that the system temperature might not exceed 18° C. At the end of dropwise addition, stirring was continued at room temperature overnight.

[Chem. 32]

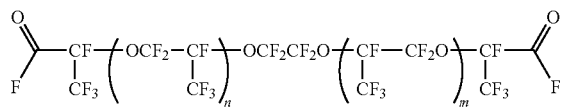

(Herein m + n ≈ 35)

The reaction product was then dissolved in 70 g of 1,3-bis(trifluoromethyl)benzene. The solution was washed with 70 g of water, then with 100 g of acetone. The solvent was distilled off in vacuum. The reaction product was then dissolved in 209 g of a fluorochemical solvent (trade name PF-5060 from 3M Company), to which 10.5 g of activated carbon (trade name SHIRASAGI AS from Osaka Gas Chemicals Co., Ltd.) was added. The mixture was stirred at room temperature for 1 hour. After the activated carbon was filtered off, the solvent was distilled off in vacuum, yielding 202 g of a product having the following formula (40) in orange oil form.

[Chem. 33]

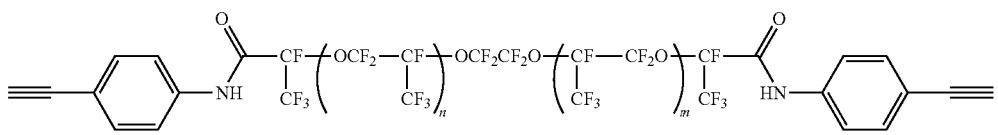

(Herein m + n ≈ 35)

On $^1$H-NMR analysis, the content of —C≡C—H assigned to the alkyne having formula (40) obtained in Step 1 was computed to be $0.277 \times 10^{-3}$ mol/g.

The $^1$H-NMR spectrum of the product obtained in Step 1: δ 8.18 (s, —NH—, 1H), δ 7.69-7.04 (m, phenyl, 4H), δ 2.80 (s, —C≡CH, 1H) From the data, the molecular chain end structure of the product obtained in Step 1 was identified compliant with the molecular chain end structure of the perfluoroether of alkyne compound having formula (40).

Step 2:

A 300-mL flask was charged with a mixture of 100 g of the alkyne of the general formula (40) (H value: $0.277 \times 10^{-3}$ mol/g) obtained in Step 1, 9.9 mL of a toluene solution of 3-bromo-1-propyne (9.2 mol/L, 0.091 mol), and 23 g (0.17 mol) of potassium carbonate. After the flask was blanketed with nitrogen, 200 g of acetone was added thereto. Stirring was continued overnight under reflux conditions (temperature 77° C.). After the completion of reaction, the reaction mixture was diluted with 100 g of 1,3-bis(trifluoromethyl) benzene and filtered to remove the potassium carbonate. The solvent was distilled off in vacuum. The reaction product thus obtained was dissolved in 200 g of a fluorochemical solvent (trade name PF-5060 from 3M Company). The solution was washed with 80 g of acetone. By distilling off the solvent in vacuum, 100 g of a compound having the following formula (41) was obtained in orange oil form.

Steps 1 and 2 were repeated twice, obtaining 200 g, in total, of the compound having the following formula (41) in orange oil form.

[Chem. 34]

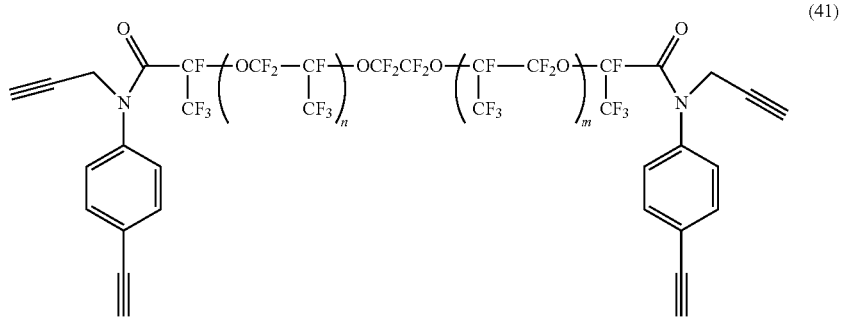

(41)

(Herein m + n ≈ 35)

On $^1$H-NMR analysis, the —C≡C—H value (i.e., ethynyl content) assigned to the alkyne structure in the polymer having formula (41) obtained in Step 2 was computed to be $0.491 \times 10^{-3}$ mol/g.

The $^1$H-NMR spectrum of the product obtained in Step 2: δ 7.58-7.01 (m, phenyl, 4H), δ 4.41 (dd, J=22 Hz, 8 Hz, N—CH$_2$—, 2H), δ 2.84 (s, C(sp2)-C≡CH, 1H), δ 2.01 (s, C(sp3)-C≡CH, 1H)

From the data, the molecular chain end structure of the product obtained in Step 2 was identified compliant with the molecular chain end structure of the perfluoroether of alkyne compound having formula (41).

Synthesis Example B2

The same procedure as in Synthesis Example B1 was repeated except that 209 g of perfluoropolyether of formula (39) (C(=O)F concentration: $0.127 \times 10^{-3}$ mol/g) in which the number of repeating HFPO units in its main chain was 94 units (m+n≈94) was used instead of 209 g of perfluoropolyether based on the main chain of pentatriacontamer HFPO skeleton (m+n≈35), represented by formula (39), in Synthesis Example B1 and stirring in Step 2 was performed in acetonitrile under reflux conditions (temperature 100° C.) for 3.5 days. There was obtained a compound having the following formula (42) (ethynyl content: $0.247 \times 10^{-3}$ mol/g).

[Chem. 35]

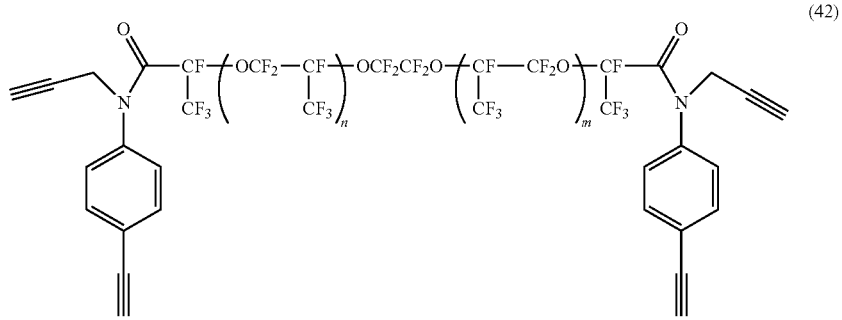

(42)

(Herein m + n ≈ 94)

Example 1

A plastic container was charged with 65.0 g of the compound having the following formula (33) (azide content: $0.274 \times 10^{-3}$ mol/g) obtained in Synthesis Example A1 and 36.3 g of the compound having the following formula (41) (ethynyl content: $0.491 \times 10^{-3}$ mol/g) obtained in Synthesis Example B1, which were mixed until uniform, followed by degassing in vacuum.

[Chem. 36]

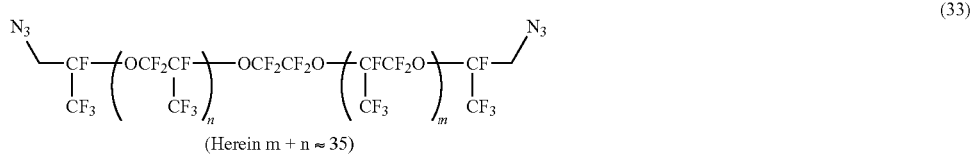

(Herein $m + n \approx 35$)

[Chem. 37]

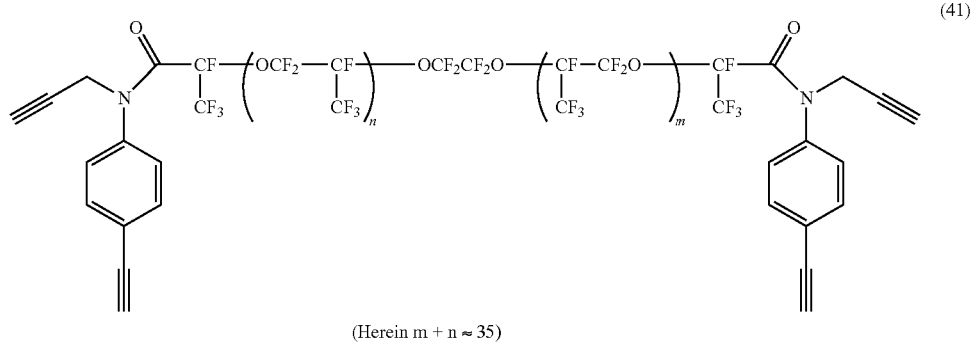

(Herein $m + n \approx 35$)

The resulting composition was cast into a stainless steel mold of 2 mm deep and press cured at 150° C. for 4 hours, yielding a pale orange clear rubber-like cured product of 2 mm thick.

Example 2

A plastic container was charged with 75.4 g of the compound having the following formula (35) (azide content: $0.116 \times 10^{-3}$ mol/g) obtained in Synthesis Example A2 and 17.8 g of the compound having the above formula (41) obtained in Synthesis Example B1, which were mixed until uniform, followed by degassing in vacuum.

[Chem. 38]

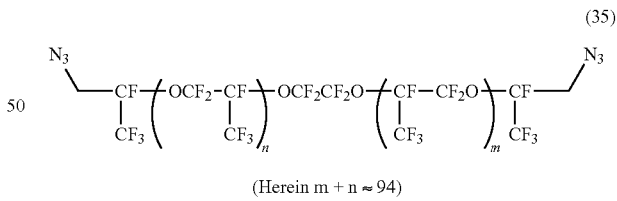

(Herein $m + n \approx 94$)

The resulting composition was cast into a stainless steel mold of 2 mm deep and press cured at 150° C. for 8.5 hours, yielding a pale orange clear rubber-like cured product of 2 mm thick.

Example 3

A plastic container was charged with 42.9 g of the compound having the above formula (33) obtained in Synthesis Example A1 and 47.6 g of the compound having the following formula (42) (ethynyl content: $0.247 \times 10^{-3}$ mol/g) obtained in Synthesis Example B2, which were mixed until uniform, followed by degassing in vacuum.

[Chem. 39]

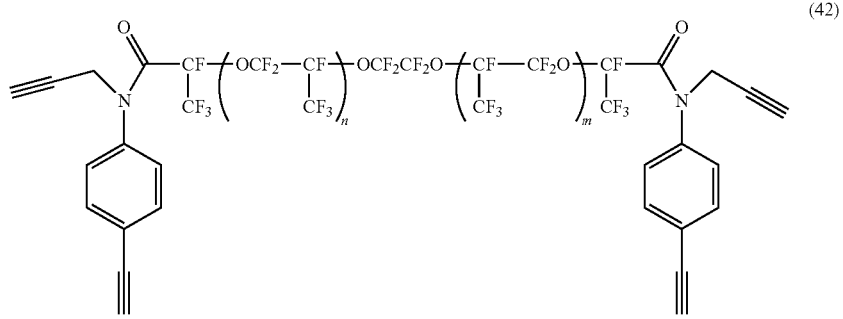

(42)

(Herein m + n ≈ 94)

The resulting composition was cast into a stainless steel mold of 2 mm deep and press cured at 150° C. for 6 hours, yielding a pale orange clear rubber-like cured product of 2 mm thick.

Example 4

A plastic container was charged with 17.2 g of the compound having the following formula (38) (azide content: $1.08 \times 10^{-3}$ mol/g) obtained in Synthesis Example A3 and 37.8 g of the compound having the above formula (41) obtained in Synthesis Example B1, which were mixed until uniform, followed by degassing in vacuum.

[Chem. 40]

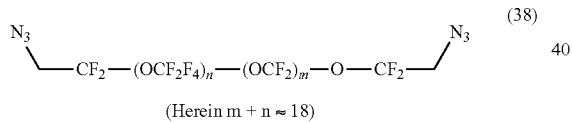

(38)

(Herein m + n ≈ 18)

The resulting composition was cast into a stainless steel mold of 2 mm deep and press cured at 150° C. for 1.5 hours, yielding a pale orange clear rubber-like cured product of 2 mm thick.

Example 5

A plastic container was charged with 34.0 g of the compound having the above formula (33) obtained in Synthesis Example A1 and 19.0 g of the compound having the above formula (41) obtained in Synthesis Example B1, which were mixed until uniform. To the mixture, 3.59 g of 25 wt % solution of copper iodide in DMSO (a ratio of the copper amount (mol) to the azide content (mol/100 g) in the compound of formula (33): 50 mol %) was added, followed by further mixing. After centrifugal degassing, the resulting composition was cast into a stainless steel mold of 2 mm deep and allowed to cure at 23° C. and humidity 60% for one week, yielding a brown rubber-like cured product.

Comparative Example 1

625 g of a compound having the following formula (43) (vinyl content: $0.117 \times 10^{-3}$ mol/g), 145 g of a compound having the following formula (44) (SiH content: $0.606 \times 10^{-3}$ mol/g), 1.56 g of a compound having the following general formula (45), and 0.63 g of a toluene solution of platinum-divinyltetramethyldisiloxane complex (platinum content 0.5 mol %) were mixed until uniform and then mixed in vacuum for 10 minutes.

[Chem. 41]

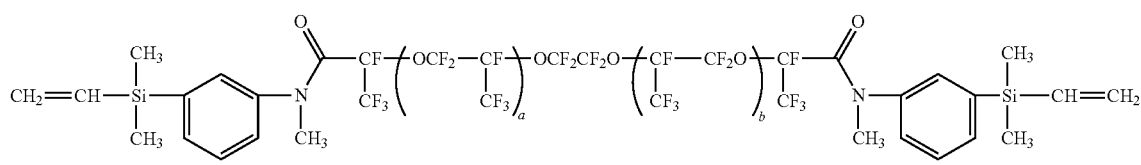

(43)

(Herein a + b ≈ 97)

[Chem. 42]

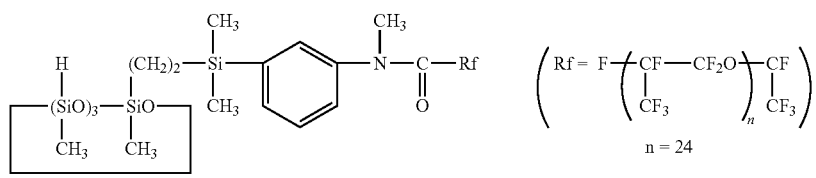

(44)

[Chem. 43]

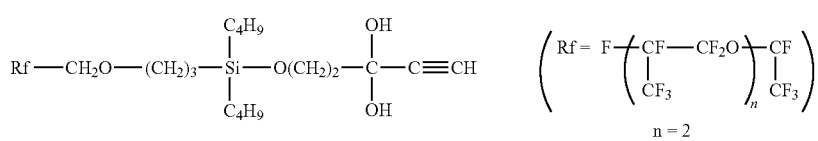

(45)

The resulting composition was cast into a stainless steel mold of 2 mm deep and press cured at 150° C. for 10 minutes. The resulting sheet was taken out from the mold and post-cured at 150° C. for 1 hour, yielding a colorless clear rubber-like compound.

Comparative Example 2

600 g of a compound having the following formula (46) (vinyl content: $0.122 \times 10^{-3}$ mol/g), 145 g of the compound having the above formula (44), 1.50 g of the compound (reaction inhibitor) having the general formula (45), and 0.63 g of a toluene solution of platinum-divinyltetramethyldisiloxane complex (platinum content 0.5 mol %) were mixed until uniform and then mixed in vacuum for 10 minutes.

TABLE 1

|  | Durometer hardness (type A) | Tensile strength (MPa) | Elongation at break (%) |
|---|---|---|---|
| Example 1 | 22 | 0.8 | 320 |
| Example 2 | 18 | 1.0 | 400 |
| Example 3 | 20 | 1.2 | 420 |
| Example 4 | 19 | 0.8 | 320 |
| Example 5 | 35 | 1.4 | 180 |
| Comparative Example 1 | 18 | 0.4 | 210 |
| Comparative Example 2 | 21 | 0.4 | 160 |

As seen from the results in Table 1, the cured products in Examples 1 to 4 which had been prepared by heating had satisfactory rubber properties. The cured product in

[Chem. 44]

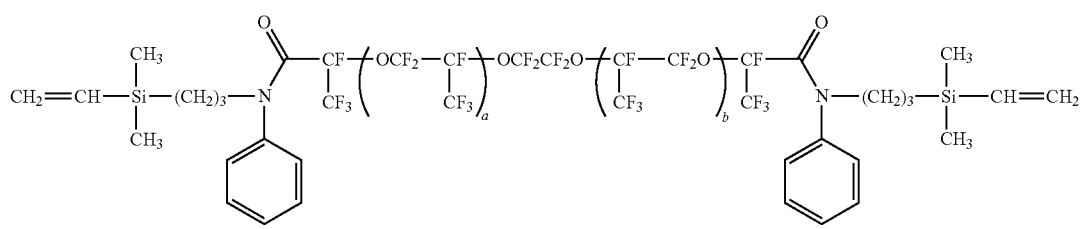

(46)

(Herein a + b ≈ 95)

The resulting composition was cast into a stainless steel mold of 2 mm deep and press cured at 150° C. for 10 minutes. The resulting sheet was taken out from the mold and post-cured at 150° C. for 1 hour, yielding a colorless clear rubber-like cured product.

Samples of the cured products (elastomers) prepared in Examples 1 to 5 and Comparative Examples 1 and 2 were measured for rubber properties according to JIS K6250, K6251, and K6253. The results are shown in Table 1.

Example 5 having copper iodide added as component (c) also displayed satisfactory rubber properties.

The cured product samples were further evaluated by the following tests.

(Heat Resistance Test)

The cured product samples obtained in Examples 1 to 4 and Comparative Examples 1 and 2 were subjected to a heat aging resistance test at 150° C. (air-oven aging test: type A durometer hardness, tensile strength, and elongation at break) according to JIS K6257. The results are shown in FIGS. 1 to 3. As used herein, the term "hardness change" refers to a change of hardness from the hardness before heating.

The cured product samples (elastomers) in Comparative Examples 1 and 2 exhibited relatively stable heat aging properties on heating at 150° C. The cured product samples in Examples 1 to 4 showed an increase of hardness change and an increase of tensile strength due to the accelerated crosslinking reaction at the initial stage of the test (after 200 hours from the start) as compared with the cured product samples in Comparative Examples 1 and 2. However, the increases of hardness change and tensile strength were slight, and moreover, the physical properties of the samples in Examples 1 to 4 followed stable transitions at high levels after that time as compared with the samples in Comparative Examples 1 and 2. These results indicate that the rubber cured products in Examples 1 to 4 have sufficient heat resistance.

(Low-Temperature Property Test)

The cured product samples obtained in Examples 1 to 4 and Comparative Examples 1 and 2 were measured for glass transition temperature (Tg) by differential scanning calorimetry (DSC). The cured products in Examples 1, 2, and 3 had a Tg of −50° C. and the cured product in Example 4 had a Tg of −90° C. These values are by no means inferior to the Tg (−54° C.) of the cured products in Comparative Examples 1 and 2. It was demonstrated that the cured products obtained from the compositions of Examples 1 to 4 had excellent low-temperature properties.

(Organic Solvent Resistance Test)

The cured product samples obtained in Examples 1 to 4 and Comparative Examples 1 and 2 were subjected to an immersion test (immersion time: 70 hours) in various organic solvents according to JIS K6258. A change (%) of volume before and after immersion was measured for evaluating solvent swell resistance. The results are shown in Table 2.

TABLE 2

| | Organic solvent | | | | [Volume change (%)] | | |
|---|---|---|---|---|---|---|---|
| | Ethyl acetate | Acetone | N,N-dimethyl-formamide | tetrahydro-furan | Chloroform | Hexane | Toluene |
| Example 1 | 9 | 7 | 3 | 10 | 7 | 4 | 3 |
| Example 2 | 7 | 6 | 2 | 7 | 5 | 4 | 3 |
| Example 3 | 9 | 6 | 3 | 8 | 5 | 4 | 3 |
| Example 4 | 11 | 9 | 4 | 12 | 8 | 4 | 4 |
| Comparative Example 1 | 7 | 5 | 1 | 9 | 10 | 8 | 5 |
| Comparative Example 2 | 7 | 5 | 1 | 9 | 9 | 7 | 5 |

The results in Table 2 demonstrate that the cured products obtained in Examples 1 to 4 have excellent solvent swell resistance like the cured products in Comparative Examples 1 and 2.

(Acid Resistance Test)

Figure 4:
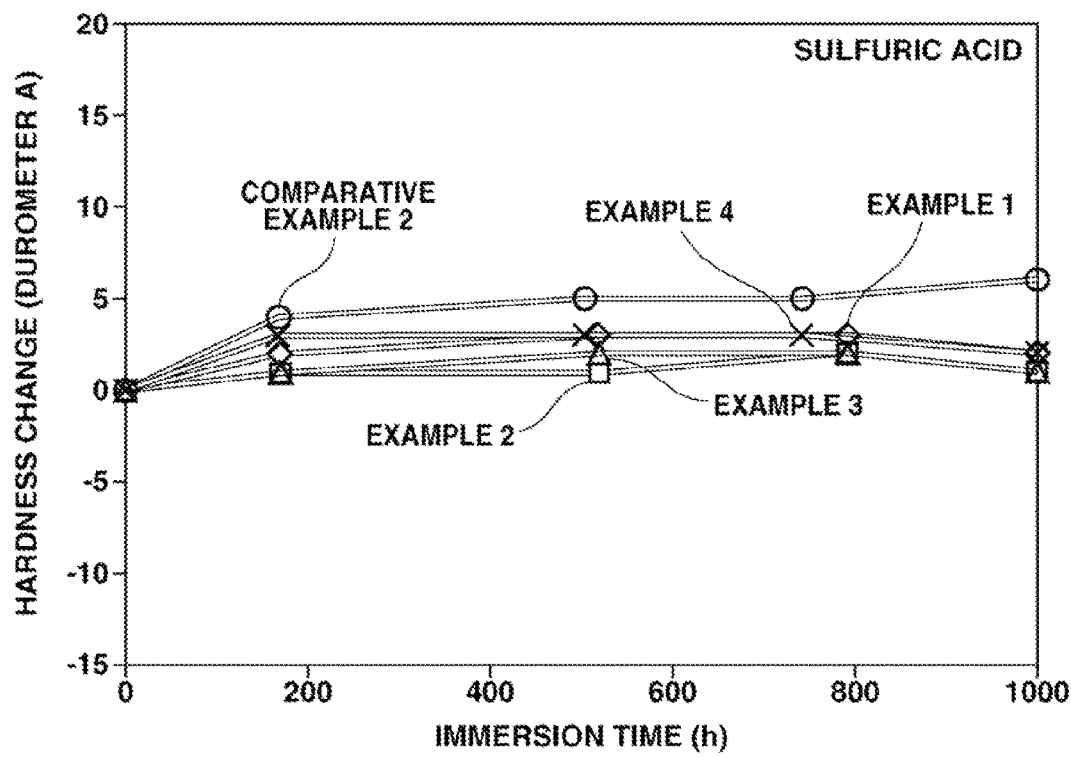
FIG. 4 is a diagram showing transitions of the hardness change of the cured products prepared in Examples 1 to 4 and Comparative Example 2 in a sulfuric acid resistance test.
Figure 5:
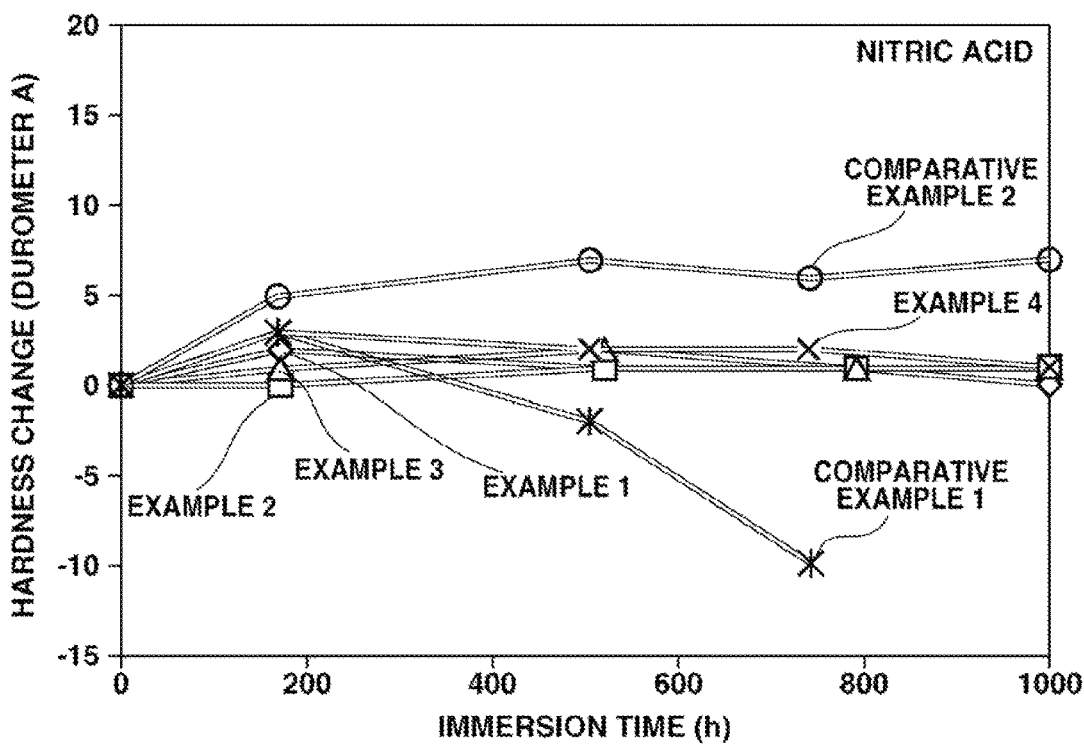
FIG. 5 is a diagram showing transitions of the hardness change of the cured products prepared in Examples 1 to 4 and Comparative Examples 1 and 2 in a nitric acid resistance test.

The cured products obtained in Examples 1 to 4 were subjected to immersion tests at 40° C. in 98 wt % conc. sulfuric acid and 40 wt % conc. nitric acid. A hardness change from the hardness before immersion was measured for evaluating sulfuric acid resistance and nitric acid resistance. The results are shown in FIG. 4 (sulfuric acid resistance) and FIG. 5 (nitric acid resistance).

The cured product obtained in Comparative Example 1 turned oily due to decomposition of the polymer after one week of immersion in sulfuric acid. For this reason, Comparative Example 1 is not shown in FIGS. 4 and 5. Also in the immersion test in nitric acid, the cured product in Comparative Example 1 showed a tendency of softening degradation as a result of the polymer being decomposed. The cured product in Comparative Example 2 showed an increase of hardness change especially in the immersion test in nitric acid.

On the other hand, the cured products in Examples 1 to 4 showed no substantial change of hardness until 1,000 hours of immersion in either of sulfuric acid and nitric acid. These results indicate that the cured products obtained in Examples 1 to 4 have improved acid resistance.

While the invention has been described with reference to the foregoing embodiments, the invention is not limited thereto. Various other embodiments having additions, modifications, and eliminations may occur to persons skilled in the art. Any embodiments exerting equivalent functions and results are believed to be within the spirit and scope of the invention.

The invention claimed is:

1. A perfluoropolyether-based rubber composition comprising:
   (a) a linear perfluoropolyether compound having the following general formula (1):

$$N_3\text{-}A\text{-}Rf^1\text{-}A\text{-}N_3 \tag{1}$$

wherein A is a divalent straight aliphatic saturated hydrocarbon group of 1 to 6 carbon atoms and $Rf^1$ is a divalent perfluoropolyether group, and having a number average molecular weight of 1,000 to 100,000 and
   (b) a linear perfluoropolyether compound containing at least three ethynyl groups per molecule.

2. The perfluoropolyether-based rubber composition of claim 1 wherein component (b) is a compound having the following general formula (2):

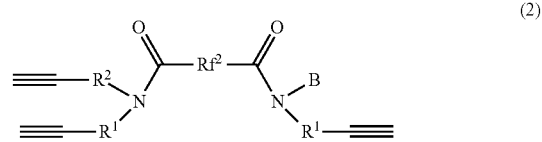

wherein $R^1$ and $R^2$ are each independently a divalent straight or branched aliphatic saturated hydrocarbon group or arylene group, B is hydrogen, phenyl, a monovalent straight or branched aliphatic unsaturated hydrocarbon group or a group having the following general formula (3):

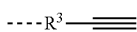
(3)

wherein R³ is a divalent straight or branched aliphatic saturated hydrocarbon group or arylene group and the broken line designates a valence bond, and Rf² is a divalent perfluoropolyether group, with the proviso that R¹ and R² on the left in formula (2), and R¹ and B (or R³ when B is a group of formula (3)) on the right in formula (2) may be linked via a single or double bond to form a cyclic structure attached to the corresponding nitrogen atom.

3. The perfluoropolyether-based rubber composition of claim 2 wherein R¹ and R² in the general formula (2) each are a divalent straight aliphatic saturated hydrocarbon group of 1 to 10 carbon atoms, a divalent branched aliphatic saturated hydrocarbon group of 2 to 10 carbon atoms, or an arylene group having any one of the following general formulae (4) to (9):

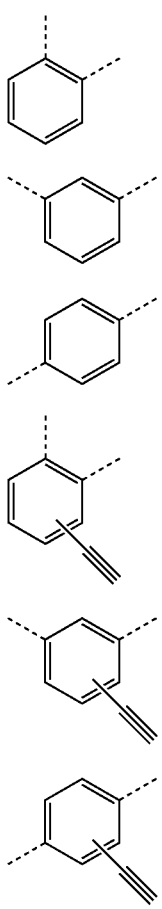

wherein the broken line designates a valence bond.

4. The perfluoropolyether-based rubber composition of claim 2 wherein R³ in the general formula (3) is a divalent straight aliphatic saturated hydrocarbon group of 1 to 10 carbon atoms, a divalent branched aliphatic saturated hydrocarbon group of 2 to 10 carbon atoms, or an arylene group having any one of the following general formulae (4) to (9):

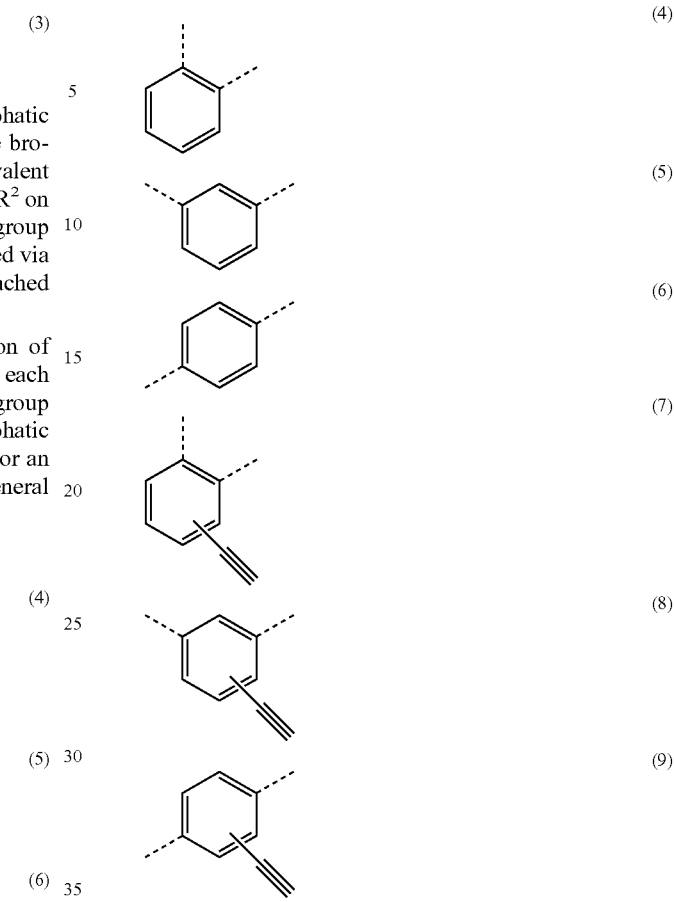

wherein the broken line designates a valence bond.

5. The perfluoropolyether-based rubber composition of claim 1 which is heat curable.

6. The perfluoropolyether-based rubber composition of claim 1, further comprising (c) a transition metal catalyst.

7. The perfluoropolyether-based rubber composition of claim 6 which is room temperature curable.

8. A perfluoropolyether-based rubber cured product which is formed by curing the perfluoropolyether-based rubber composition of claim 1.

9. An article comprising the cured product of claim 8.

10. The article of claim 9 which is a rubber part for use in an automobile, chemical plant, inkjet printer, semiconductor manufacturing line, analytical or scientific instrument, medical equipment, residential environment or aircraft.

11. A perfluoropolyether-based rubber composition comprising:
(a) a linear perfluoropolyether compound having the following general formula (1):

$$N_3\text{-A-Rf}^1\text{-A-N}_3 \quad (1)$$

wherein A is a divalent straight aliphatic saturated hydrocarbon group of 1 to 6 carbon atoms and Rf¹ is a divalent perfluoropolyether group containing repeating perfluoroalkylether units of one or more types having the following formula:

$$-(C_aF_{2a}O)_x-$$

wherein "a" is an integer of 1 to 6, and x is an integer of 5 to 600, and (b) a linear perfluoropolyether compound containing at least three ethynyl groups per molecule.

12. A perfluoropolyether-based rubber cured product which is formed by curing the perfluoropolyether-based rubber composition of claim 11.

13. An article comprising the cured product of claim 12.

14. The article of claim 13 which is a rubber part for use in an automobile, chemical plant, inkjet printer, semiconductor manufacturing line, analytical or scientific instrument, medical equipment, residential environment or aircraft.

* * * * *